(12) United States Patent
Cypher et al.

(10) Patent No.: US 9,323,615 B2
(45) Date of Patent: Apr. 26, 2016

(54) EFFICIENT DATA READS FROM DISTRIBUTED STORAGE SYSTEMS

(71) Applicant: Google Inc., Mountain View, CA (US)

(72) Inventors: Robert Cypher, Saratoga, CA (US);
Sean Quinlan, Palo Alto, CA (US);
Steven Robert Schirripa, Hazlet, NJ (US); Lidor Carmi, New York, NY (US); Christian Eric Schrock, Cold Spring Harbor, NY (US)

(73) Assignee: Google Inc., Mountain View, CA (US)

( * ) Notice: Subject to any disclaimer, the term of this patent is extended or adjusted under 35 U.S.C. 154(b) by 137 days.

(21) Appl. No.: 14/169,322

(22) Filed: Jan. 31, 2014

(65) Prior Publication Data

US 2015/0220429 A1     Aug. 6, 2015

(51) Int. Cl.
*G06F 12/02* (2006.01)
*G06F 11/10* (2006.01)

(52) U.S. Cl.
CPC .................................. *G06F 11/1076* (2013.01)

(58) Field of Classification Search
CPC .................. G06F 17/30194; G06F 11/1076
USPC ........................................................ 711/170
See application file for complete search history.

(56) References Cited

U.S. PATENT DOCUMENTS

| | | | |
|---|---|---|---|
| 7,930,611 B2 | 4/2011 | Huang et al. | |
| 8,285,686 B2 | 10/2012 | Kesselman | |
| 8,341,457 B2 | 12/2012 | Spry et al. | |
| 8,615,698 B1 | 12/2013 | Cypher | |
| 2008/0222480 A1* | 9/2008 | Huang et al. | 714/752 |
| 2011/0078277 A1 | 3/2011 | Baptist | |
| 2011/0225453 A1* | 9/2011 | Spry et al. | 714/15 |
| 2012/0284229 A1* | 11/2012 | Kim et al. | 707/634 |
| 2012/0290878 A1* | 11/2012 | Gladwin et al. | 714/20 |
| 2013/0275776 A1 | 10/2013 | Baptist et al. | |
| 2015/0095136 A1* | 4/2015 | Jalali et al. | 705/14.41 |

FOREIGN PATENT DOCUMENTS

WO    WO-2012147087 A1    11/2012

OTHER PUBLICATIONS

International Search Report and Written Opinion for related PCT Application No. PCT/US2015/012599 dated Mar. 31, 2015.
CC. Huang, M. Chen, and J. Li, "Pyramid Codes: Schemes to Trade Space for Access Effciency in Reliable Data Storage Systems,"Proc. of IEEE NCA, Cambridge, MA, Jul. 2007.

* cited by examiner

*Primary Examiner* — Yong Choe
(74) *Attorney, Agent, or Firm* — Honigman Miller Schwartz and Cohn LLP

(57) ABSTRACT

A method of distributing data in a distributed storage system includes receiving a file into non-transitory memory and dividing the received file into chunks. The chunks are data-chunks and non-data chunks. The method also includes grouping one or more of the data chunks and one or more of the non-data chunks in a group. One or more chunks of the group is capable of being reconstructed from other chunks of the group. The method also includes distributing the chunks of the group to storage devices of the distributed storage system based on a hierarchy of the distributed storage system. The hierarchy includes maintenance domains having active and inactive states, each storage device associated with a maintenance domain, the chunks of a group are distributed across multiple maintenance domains to maintain the ability to reconstruct chunks of the group when a maintenance domain is in an inactive state.

22 Claims, 22 Drawing Sheets

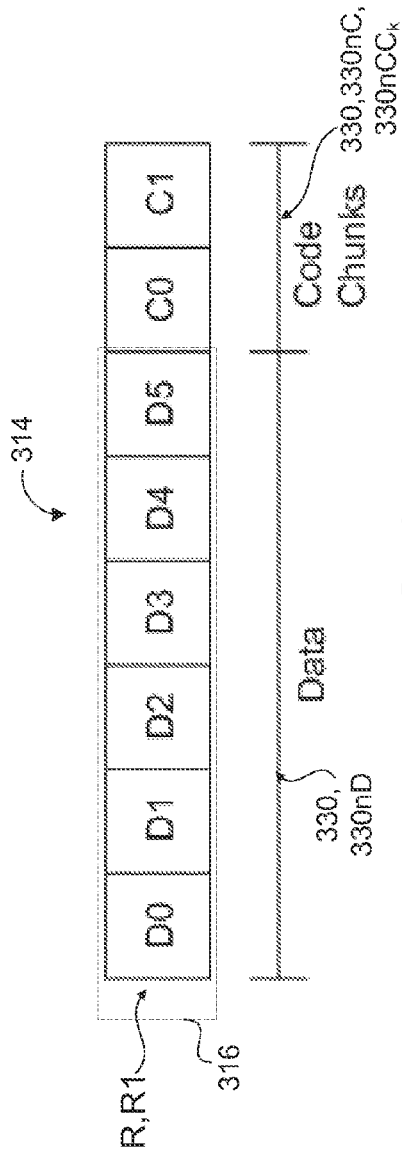
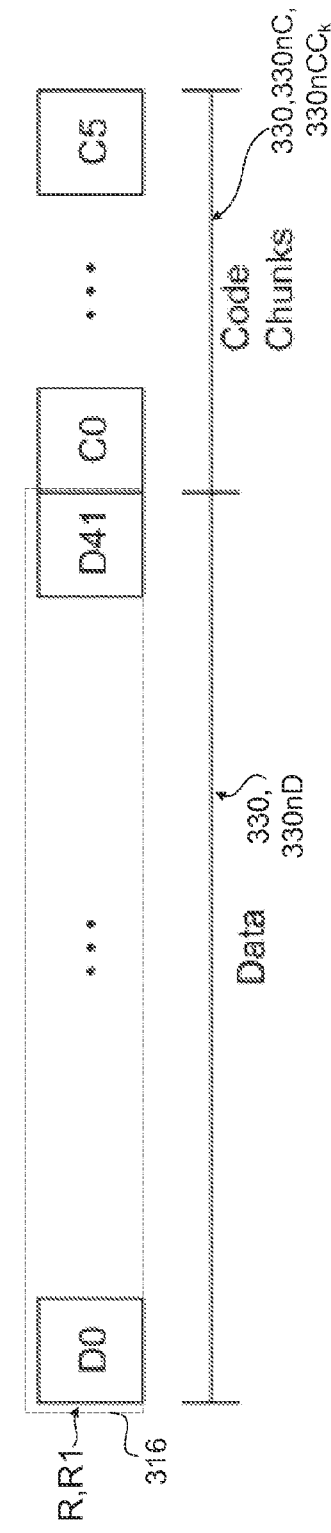
FIG. 3D
FIG. 3E

EFFICIENT DATA READS FROM DISTRIBUTED STORAGE SYSTEMS

TECHNICAL FIELD

This disclosure relates to efficient data reads from distributed storage systems.

BACKGROUND

A distributed system generally includes many loosely coupled computers, each of which typically includes a computing resource (e.g., one or more processors) and/or storage resources (e.g., memory, flash memory, and/or disks). A distributed storage system overlays a storage abstraction (e.g., key/value store or file system) on the storage resources of a distributed system. In the distributed storage system, a server process running on one computer can export that computer's storage resources to client processes running on other computers. Remote procedure calls (RPC) may transfer data from server processes to client processes. Alternatively, Remote Direct Memory Access (RDMA) primitives may be used to transfer data from server hardware to client processes.

SUMMARY

One aspect of the disclosure provides a method of distributing data in a distributed storage system. The method includes receiving a file into non-transitory memory and dividing the received file into chunks using a computer processor in communication with the non-transitory memory. The method also includes grouping one or more of the data chunks and one or more of the non-data chunks in a group. One or more chunks of the group are capable of being reconstructed from other chunks of the group. The method further includes distributing chunks of the group to storage devices of the distributed storage system based on a hierarchy of the distributed storage system. The hierarchy includes maintenance domains having active and inactive states. Moreover, each storage device is associated with a maintenance domain. The chunks of a group are distributed across multiple maintenance domains to maintain the ability to reconstruct chunks of the group when a maintenance domain is in an inactive state.

Implementations of the disclosure may include one or more of the following features. In some implementations, the method further includes restricting the number of chunks of a group distributed to storage devices of any one maintenance domain.

In some implementations, the method includes determining a distribution of the chunks of a group among the storage devices by determining a first random selection of storage devices that matches a number of chunks of the group and determining if the selection of storage devices is capable of maintaining accessibility of the group when one or more units are in an inactive state. In some examples, when the first random selection of storage devices is incapable of maintaining accessibility of the group when one or more maintenance domains are in an inactive state, the method further includes determining a second random selection of storage devices that match the number of chunks of the group or modifying the first random selection of storage devices by adding or removing one or more randomly selected storage devices. The method may further include determining the first random selection of storage devices using a simple sampling, a probability sampling, a stratified sampling, or a cluster sampling.

In some implementations, the method includes determining a distribution of the chunks of the group among the storage devices by selecting a consecutive number of storage devices equal to a number of chunks of the group from an ordered circular list of the storage devices of the distributed storage. When the selected storage devices are collectively incapable of maintaining the accessibility of the group when one or more maintenance domains are in an inactive state, the method further includes selecting another consecutive number of storage devices from the ordered circular list equal to the number of chunks of the group. The method may include determining the ordered circular list of storage devices of the distributed storage system. Adjacent storage devices on the ordered circular list are associated with different maintenance domains. In some examples, a threshold number of consecutive storage devices on the ordered circular list are each associated with different maintenance domains or are each in different geographical locations.

In some implementations, the method includes determining the maintenance hierarchy of maintenance domains (e.g., using the computer processor), where the maintenance hierarchy has maintenance levels and each maintenance level includes one or more maintenance domains. The method also includes mapping each maintenance domain to at least one storage device. In some examples, each maintenance domain includes storage devices powered by a single power distribution unit or a single power bus duct.

The method may include dividing the received file into stripes. Each file includes an error correcting code. The error correcting code is one of a nested code or a layered code. The non-data chunks include code-check chunks, word-check chunks, and code-check-word-check chunks.

Another aspect of the disclosure provides a system for distributing data in a distributed storage system. The system includes non-transitory memory, a computer processor, and storage devices. The non-transitory memory receives a file. The computer processor communicates with the non-transitory memory and divides the received files into chunks. The chunks are data-chunks and non-data chunks. The computer processor further groups one or more of the data chunks and one or more the non-data chunks in a group. One or more chunks of the group are capable of being reconstructed from other chunks of the group. The storage devices communicate with the computer processor and the non-transitory memory. The computer processor stores the chunks of the group on the storage devices based on a maintenance hierarchy of the distributed storage system. The maintenance hierarchy includes maintenance domains having active and inactive states. Each storage device is associated with a maintenance domain. The computer processor distributes the chunks of a group across multiple maintenance domains to maintain accessibility of the group when a maintenance domain is in an inactive state.

In some examples, the computer processor restricts a number of chunks of the group distributed to storage devices of any one maintenance domain. The computer processor may determine a distribution of the chunks of the group among the storage devices by determining a first random selection of storage devices matching a number of chunks of the group and by determining if the selection of storage devices is capable of maintaining accessibility of the group when one or more maintenance domains are in an inactive state. The computer processor may determine a second random selection of storage devices matching the number of chunks of the group when the first random selection of storage devices is incapable of maintaining accessibility of the group when one or more maintenance domains are in an inactive state.

In some implementations, the computer processor modifies the first random selection of storage devices by adding and removing one or more randomly selected storage devices when the first random selection of storage devices is incapable of maintaining accessibility of the file when one or more maintenance domains are in an inactive state. The computer processor may determine the first random selection of storage devices using a simple sampling, a probability sampling, a stratified sampling, or a cluster sampling.

In some examples, the computer processor determines a distribution of the chunks among the storage devices by selecting a consecutive number of storage devices equal to a number of chunks of the group from an ordered circular list of the storage devices of the distributed storage system. Moreover, the computer processor may select another consecutive number of storage devices from the ordered circular list equal to the number of chunks of the group, when the selected storage devices are collectively incapable of maintaining the accessibility of the group when one or more maintenance domains are in an inactive state.

In some implementations, the computer processor determines the ordered circular list of storage devices of the distributed storage system, where adjacent storage devices on the ordered circular list are associated with different maintenance domains. Additionally or alternatively, a threshold number of consecutive storage devices on the ordered circular list may each be associated with different maintenance domains. Additionally or alternatively, a threshold number of consecutive storage devices on the ordered circular list may each be in different geographical locations.

In some examples, the computer processor determines a maintenance hierarchy of maintenance domains and maps each maintenance domain to at least one storage device. The maintenance hierarchy has maintenance levels, with each maintenance level including one or more maintenance domains. Each maintenance domain may include storage devices powered by a single power distribution unit or a single power bus duct.

In some implementations, the computer processor divides the received file into stripes, with each file including an error correcting code. The error correcting code is one of a nested code or a layered code. The non-data chunks include code-check chunks, word-check chunks, and code-check-word-check chunks.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 3D-3F are schematic views of exemplary layered coding techniques.

Like reference symbols in the various drawings indicate like elements.

DETAILED DESCRIPTION

Figure 1A:
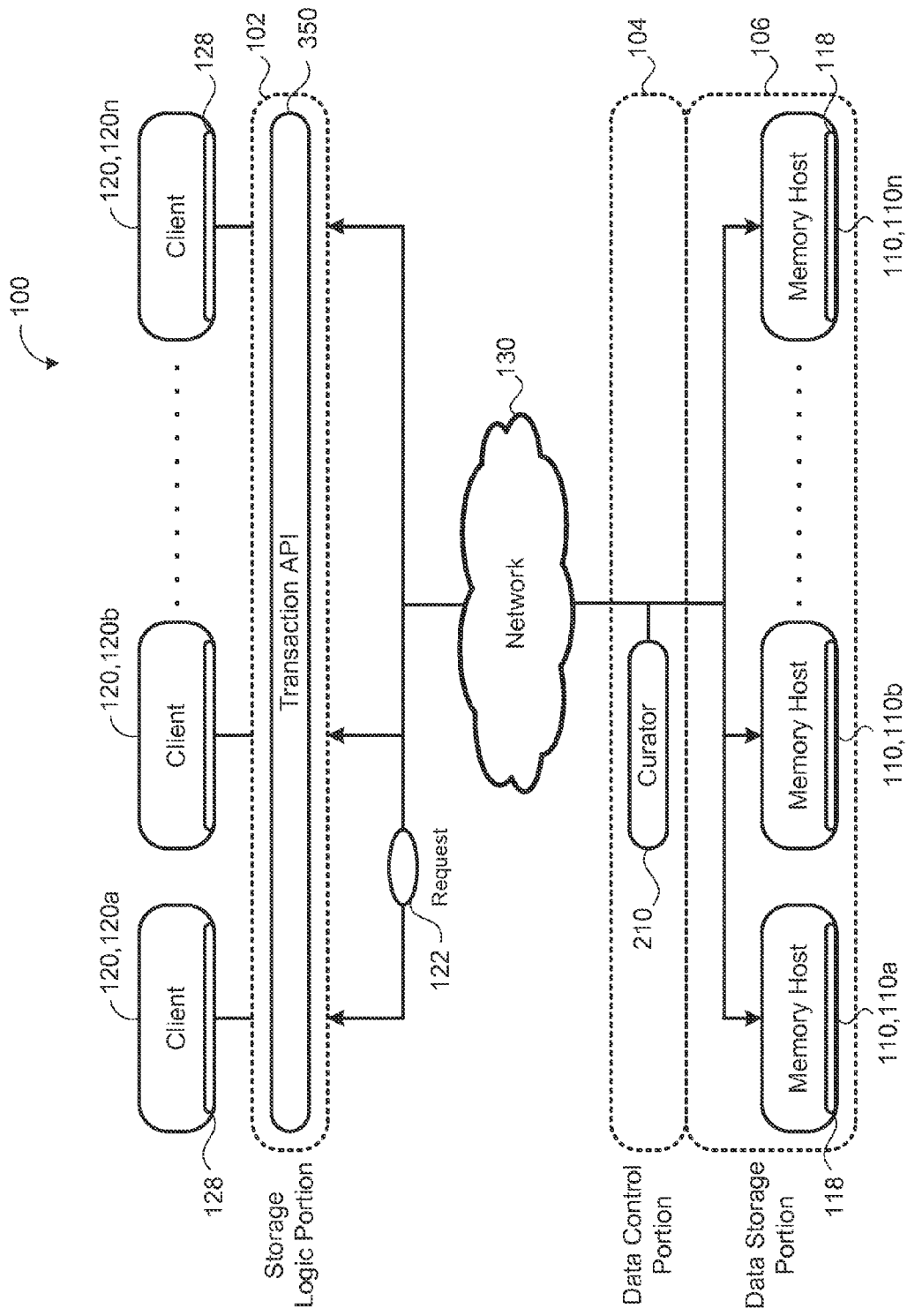
FIG. 1A is a schematic view of an exemplary distributed storage system.
Figure 1B:
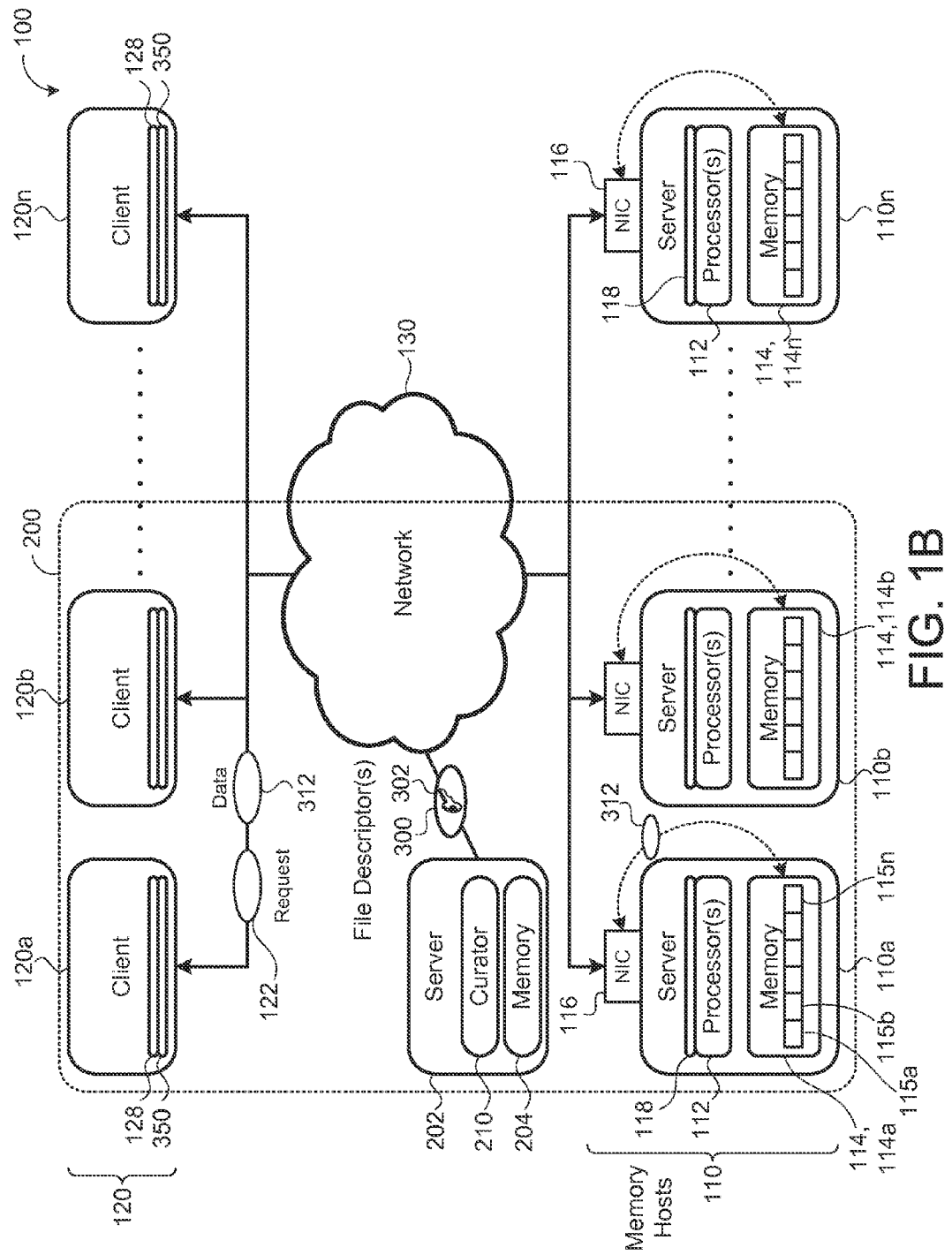
FIG. 1B is a schematic view of an exemplary distributed storage system having a cell of memory hosts managed by a curator.

Storage systems include multiple layers of redundancy where data is replicated and stored in multiple data centers. Data centers house computer systems and their associated components, such as telecommunications and storage systems 100 (FIGS. 1A and 1B). Data centers usually include backup power supplies, redundant communications connections, environmental controls (to maintain a constant temperature), and security devices. Data centers may be large industrial scale operations that use a great amount of electricity (e.g., as much as a small town). Data centers may be located in different geographical locations (e.g., different cities, different countries, and different continents). In some examples, the data centers, or a portion thereof, require maintenance (e.g., due to a power outage or disconnecting a portion of the storage system for replacing parts, or a system failure, or a combination thereof). The data stored in these data centers may be unavailable to users during the maintenance period resulting in the impairment or halt of a user's operations. Therefore, it is desirable to provide a distributed storage system 100 where a user is capable of retrieving stored data or reconstructing unhealthy or lost data despite the storage system 100 or portions thereof undergoing maintenance or a system failure.

Referring to FIGS. 1A and 1B, in some implementations, a distributed storage system 100 includes loosely coupled memory hosts 110, 110a-n (e.g., computers or servers), each having a computing resource 112 (e.g., one or more processors or central processing units (CPUs)) in communication with storage resources 114 (e.g., memory, flash memory, dynamic random access memory (DRAM), phase change memory (PCM), and/or disks) that may be used for caching data 312. A storage abstraction (e.g., key/value store or file system) overlain on the storage resources 114 allows scalable use of the storage resources 114 by one or more clients 120, 120a-n. The clients 120 may communicate with the memory hosts 110 through a network 130 (e.g., via RPC).

In some implementations, the distributed storage system 100 is "single-sided," eliminating the need for any server jobs for responding to remote procedure calls (RPC) from clients 120 to store or retrieve data 312 on their corresponding memory hosts 110 and may rely on specialized hardware to process remote requests 122 instead. "Single-sided" refers to the method by which most of the request processing on the memory hosts 110 may be done in hardware rather than by software executed on CPUs 112 of the memory hosts 110. Rather than having a processor 112 of a memory host 110 (e.g., a server) execute a server process 118 that exports access of the corresponding storage resource 114 (e.g., non-transitory memory) to client processes 128 executing on the clients 120, the clients 120 may directly access the storage resource 114 through a network interface controller (NIC) 116 of the memory host 110. In other words, a client process 128 executing on a client 120 may directly interface with one or more storage resources 114 without requiring execution of a routine of any server processes 118 executing on the computing resources 112. This single-sided distributed storage architecture offers relatively high-throughput and low latency, since clients 120 can access the storage resources 114 without interfacing with the computing resources 112 of the memory hosts 110. This has the effect of decoupling the requirements for storage 114 and CPU cycles that typical two-sided distributed storage systems 100 carry. The single-sided distributed storage system 100 can utilize remote storage resources 114 regardless of whether there are spare CPU cycles on that memory host 110; furthermore, since single-sided operations do not contend for server CPU 112 resources, a single-sided system can serve cache requests 122 with very predictable, low latency, even when memory hosts 110 are running at high CPU utilization. Thus, the single-sided distributed storage system 100 allows higher utilization of both cluster storage 114 and CPU 112 resources than traditional two-sided systems, while delivering predictable, low latency.

In some implementations, the distributed storage system 100 includes a storage logic portion 102, a data control portion 104, and a data storage portion 106. The storage logic portion 102 may include a transaction application programming interface (API) 350 (e.g., a single-sided transactional system client library) that is responsible for accessing the underlying data 312, for example, via RPC or single-sided operations. The data control portion 104 may manage allocation and access to storage resources 114 with tasks, such as allocating storage resources 114, registering storage resources 114 with the corresponding network interface controller 116, setting up connections between the client(s) 120 and the memory hosts 110, handling errors in case of machine failures, etc. The data storage portion 106 may include the loosely coupled memory hosts 110, 110a-n.

The distributed storage system 100 may store data 312 in dynamic random access memory (DRAM) 114 and serve the data 312 from the remote hosts 110 via remote direct memory access (RDMA)-capable network interface controllers 116. A network interface controller 116 (also known as a network interface card, network adapter, or LAN adapter) may be a computer hardware component that connects a computing resource 112 to the network 130. Both the memory hosts 110a-n and the client 120 may each have a network interface controller 116 for network communications. A host process 118 executing on the computing processor 112 of the memory host 110 registers a set of remote direct memory accessible regions 115a-n of the memory 114 with the network interface controller 116. The host process 118 may register the remote direct memory accessible regions 115a-n of the memory 114 with a permission of read-only or read/write. The network interface controller 116 of the memory host 110 creates a client key 302 for each registered memory region 115a-n.

The single-sided operations performed by the network interface controllers 116 may be limited to simple reads, writes, and compare-and-swap operations, none of which may be sophisticated enough to act as a drop-in replacement for the software logic implemented by a traditional cache server job to carry out cache requests and manage cache policies. The transaction API 350 translates commands, such as look-up or insert data commands, into sequences of primitive network interface controller operations. The transaction API 350 interfaces with the data control and data storage portions 104, 106 of the distributed storage system 100.

The distributed storage system 100 may include a co-located software process to register memory 114 for remote access with the network interface controllers 116 and set up connections with client processes 128. Once the connections are set up, client processes 128 can access the registered memory 114 via engines in the hardware of the network interface controllers 116 without any involvement from software on the local CPUs 112 of the corresponding memory hosts 110.

Referring to FIG. 1B, in some implementations, the distributed storage system 100 includes multiple cells 200, each cell 200 including memory hosts 110 and a curator 210 in communication with the memory hosts 110. The curator 210 (e.g., process) may execute on a computing processor 202 (e.g., server having a non-transitory memory 204) connected to the network 130 and manage the data storage (e.g., manage a file system stored on the memory hosts 110), control data placements, and/or initiate data recovery. Moreover, the curator 210 may track an existence and storage location of data 312 on the memory hosts 110. Redundant curators 210 are possible. In some implementations, the curator(s) 210 track the striping of data 312 across multiple memory hosts 110 and the existence and/or location of multiple copies of a given stripe for redundancy and/or performance. In computer data storage, data striping is the technique of segmenting logically sequential data 312, such as a file 310 (FIG. 2) into stripes, in a way that accesses of sequential segments are made to different physical memory hosts 110 (e.g., cells 200 and/or memory hosts 110). Striping is useful when a processing device requests access to data 312 more quickly than a memory host 110 can provide access. By performing segment accesses on multiple devices, multiple segments can be accessed concurrently. This provides more data access throughput, which avoids causing the processor to idly wait for data accesses. In some implementations (discussed in more detail below), each stripe may be further divided into groups G (e.g., including chunks), where accesses of sequential groups G are made to different physical memory hosts 110. Grouping of segments within a stripe may also be useful when a processing device requests access to data 312 more quickly than a memory host 110 can provide access. By providing segment access of a group G on multiple devices, multiple segments of a group G can be accessed concurrently. This also provides more data access throughput, which avoids causing the processor to idly wait for data accesses, thus improving the performance of the system 100.

In some implementations, the transaction API 350 interfaces between a client 120 (e.g., with the client process 128) and the curator 210. In some examples, the client 120 communicates with the curator 210 through one or more remote procedure calls (RPC). In response to a client request 122, the transaction API 350 may find the storage location of certain data 312 on memory host(s) 110 and obtain a key 302 that allows access to the data 312. The transaction API 350 communicates directly with the appropriate memory hosts 110 (via the network interface controllers 116) to read or write the data 312 (e.g., using remote direct memory access). In the case that a memory host 110 is non-operational, or the data 312 was moved to a different memory host 110, the client request 122 fails, prompting the client 120 to re-query the curator 210.

Figure 2:
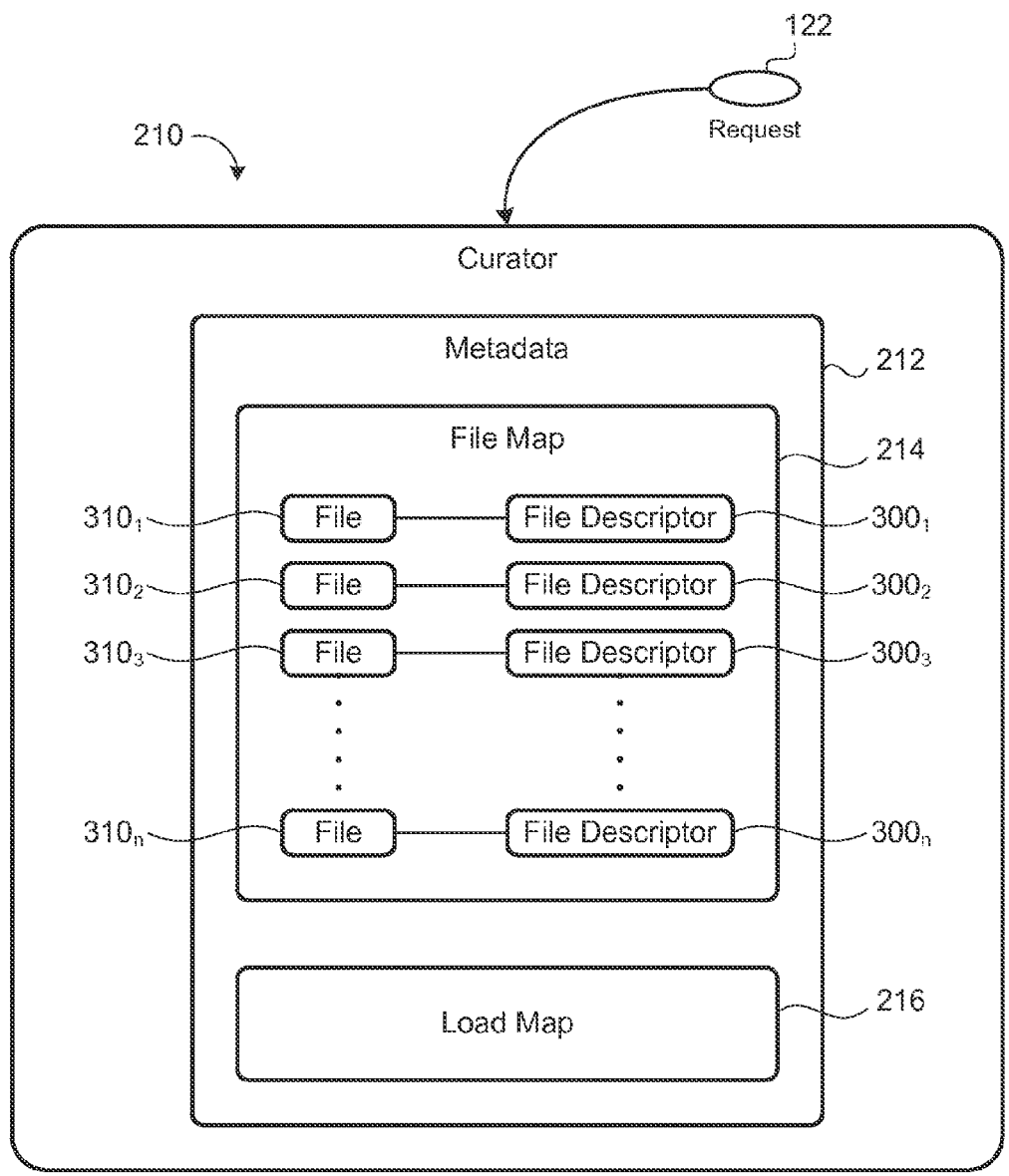
FIG. 2 is a schematic view of an exemplary curator for a distributed storage system.

Referring to FIG. 2, in some implementations, the curator 210 stores and manages file system metadata 212. The metadata 212 may include a file map 214 that maps files $310_{1-n}$ to file descriptors $300_{1-n}$. The curator 210 may examine and modify the representation of its persistent metadata 212. The curator 210 may use three different access patterns for the metadata 212: read-only, file transactions, and stripe transactions. For example, the metadata 212 can specify which parts of a file 310 are stored at which data centers, where redundant copies of data 312 are stored, which data chunks 330nD and code chunks 330nC form codewords, and the like.

Figure 3A:
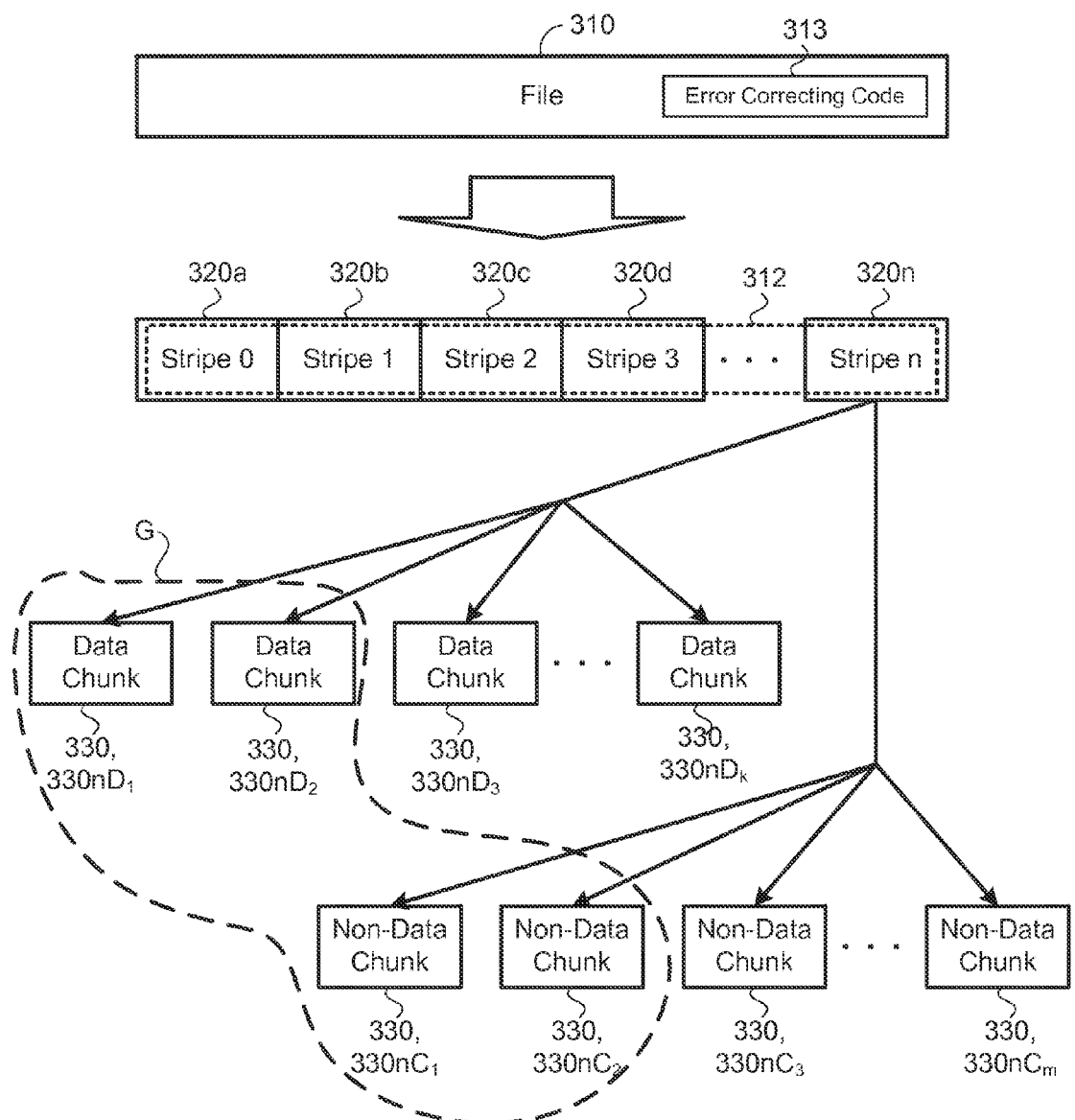
FIG. 3A is a schematic view of an exemplary file split into stripes.

Referring to FIGS. 3A-3K, data 312 may be one or more files 310. The curator 210 may divide each file 310 into a collection of stripes 320a-n, with each stripe 320a-n being encoded independently from the remaining stripes 320a-n. Each stripe 320 may be encoded and stored on different memory hosts 110. As shown in FIG. 3A, each stripe 320 is divided into data-chunks 330nD and non-data chunks 330nC based on an encoding level 313, e.g., Reed-Solomon Codes (FIG. 3B), layered codes (FIGS. 3C-3G), or nested codes (FIGS. 3H-3K), or other hierarchical codes. The non-data chunks 330nC may be code chunks 330nC (e.g., for Reed Solomon codes). In other examples, the non-data chunks 330nC may be code-check chunks 330nCC, $330nCC_{1-k}$, word-check chunks 330nWC, $330nWC_{1-m}$, and code-check-word-check chunks 330nCCWC, $330nCCWC_{1-m}$ (for layered or nested coding). A data chunk 330nD is a specified amount of data 312. In some implementations, a data chunk 330nD is a contiguous portion of data 312 from a file 310. In other implementations, a data chunk 330nD is one or more non-contiguous portions of data 312 from a file 310. For example, a data chunk 330nD can be 256 bytes or other units of data 312.

A damaged chunk 330 (e.g., data chunk 330nD or non-data chunk 330nC) is a chunk 330 containing one or more errors. Typically, a damaged chunk 330 is identified using an error detecting code 313. For example, a damaged chunk 330 can be completely erased (e.g., if the chunk 330 was stored in a hard drive destroyed in a hurricane), or a damaged chunk 330 can have a single bit flipped. A healthy chunk 330 is a chunk 330 that is not damaged. A damaged chunk 330 can be damaged intentionally, for example, where a particular memory host 110 is shut down for maintenance. A damaged chunk may be a missing or unavailable chunk. In that case, damaged chunks 330 can be identified by identifying chunks 330 that are stored at memory hosts 110 that are being shut down.

The non-data chunks 330nC of a file 310 include the error-correcting code chunk 313. The error-correcting code chunks 313 include a chunk 330 of data 312 based on one or more data-chunks 330nD. In some implementations, each code chunk 330nC is the same specified size (e.g., 256 bytes) as the data chunks 330nD. The code chunks 330nC are generated using an error-correcting code 313, e.g., a Maximal Distance Separable (MDS) code. Examples of MDS codes include Reed-Solomon codes. Various techniques can be used to generate the code chunks 330nC. For example, an error-correcting code 313 can be used that can reconstruct d data chunks 330nD from any set of unique, healthy chunks 330 (either data chunks 330nD or code chunks 330nC).

A codeword is a set of data chunks 330nD and code chunks 330nC based on those data chunks 330nD. If an MDS code is used to generate a codeword containing d data chunks 330nD and c code chunks 330nC, then all of the chunks 330 (data or code) can be reconstructed as long as any d healthy chunks 330 (data or code) are available from the codeword.

Figure 3B:
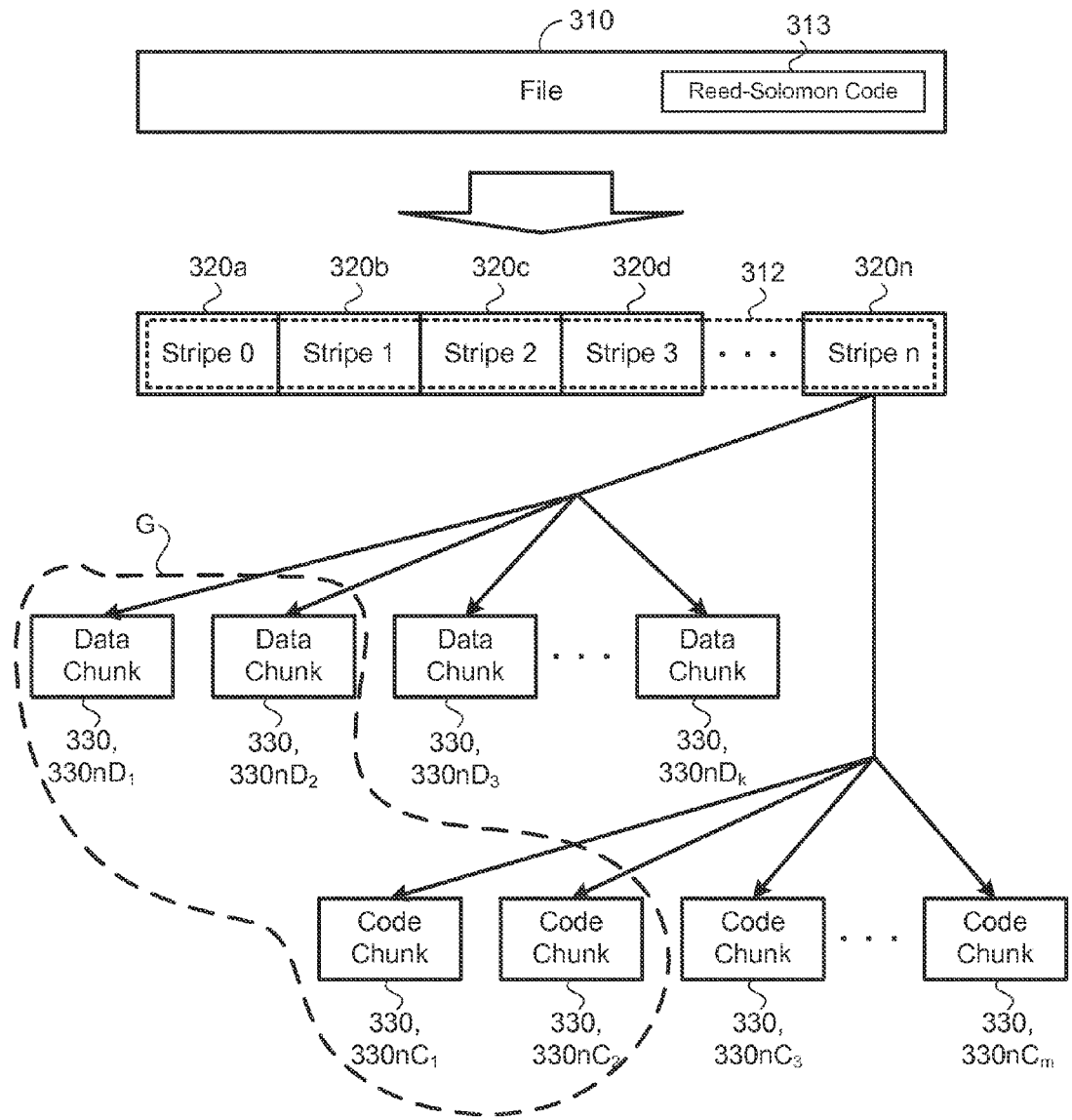
FIG. 3B is a schematic view of an exemplary file split into data chunks and code chunks.
Figure 3C:
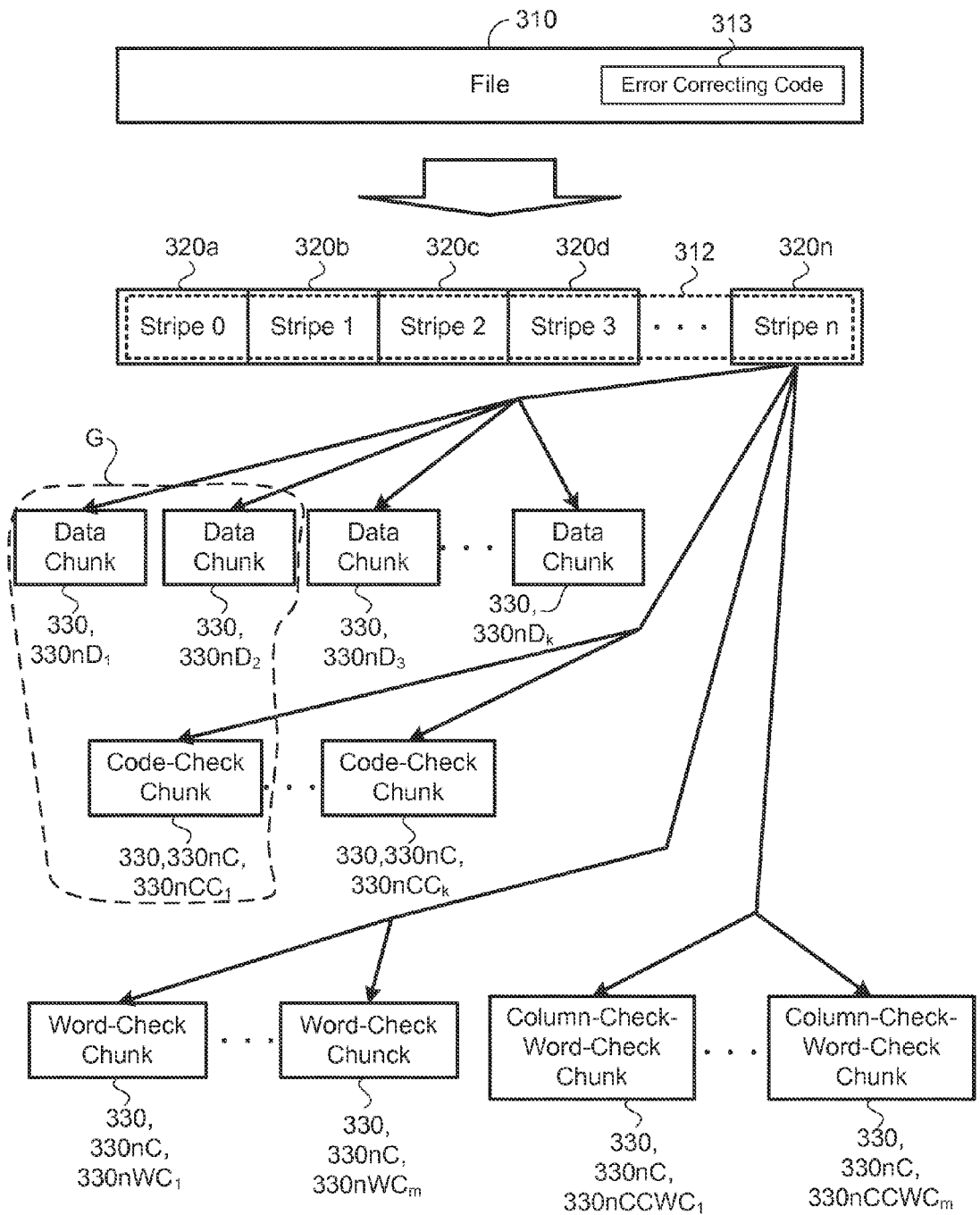
FIG. 3C is a schematic view of an exemplary Reed-Solomon coding technique.

FIG. 3B shows a Reed-Solomon encoding as the error-correcting code chunks 313. Each stripe 320 is divided into chunks 330 stored on multiple storage resources 114. The chunks 330 may be data chunks $330nD_k$ or code chunks $330nC_m$, which together form a single code word. The data chunks $330nD_k$ include the actual data 312; while the code chunks $330nC_m$ are for parity to determine if the file 310 is intact. The Reed-Solomon encoding allows for the loss of up to the total number of code chunks $330nC_m$ where the stripe 312 may still be reconstructed from the data chunk $330nD_k$. Therefore, each stripe 320a-n of a file 310 consists of multiple data chunks $330nD_k$ and code chunks $330nC_m$ that the curator 210 places on multiple storage resources 114, where the collection of data chunks $330nD_k$ and code chunks $330nC_m$ forms a single code word. In general, the curator 210 may place each stripe 320a-n on storage resources 114 independently of how the other stripes 320a-n in the file 310 are placed on storage resources 114. The Reed-Solomon Encoding 313 adds redundant data 312, or parity data 312 to a file 310, so that the file 310 can later be recovered by a receiver even when a number of errors (up to the capability of the code being used) were introduced. Reed-Solomon Encoding 313 is used to maintain data integrity in memory hosts 110, to reconstruct data 312 for performance (latency), or to more quickly drain machines.

Referring to FIGS. 3C-3I, in layered coding (FIGS. 3C-3G) and nested coding (FIGS. 3H-3K) techniques, an encoded data block 314 includes a data block 316 (having data chunks 330nD) and error-correcting code chunks 313 (i.e., non-data chunks 330nC) that is being stored is viewed as forming a two dimensional R×C array. There are X code chunks 330nC for each column C (called "code-check chunks 330nCC") that can be used to reconstruct X or fewer damaged chunks 330 per column C. There are Y code chunks 330nC (called "word-check chunks 330nWC") for the entire 2-D array. When there are more than X damaged chunks 330 in one or more columns C, the word-check chunks 330nWC are used in addition to other healthy chunks 330 to reconstruct damaged chunks 330. Although some examples described in this specification illustrate encoded data blocks 314 (i.e., data blocks 316 and code chunks 330nC (i.e., non-data chunks 330nC)) as forming a two dimensional array, it is possible for coding techniques to create encoded data blocks 314 configured differently. For instance, different columns can have different numbers of code-check chunk 330nCC, and columns that contain word-check chunks 330nWC can have different numbers of rows R than columns C that contain data chunks 330nD and code-check chunks 330nC.

The codes 330nC can be used to store data 312 across memory hosts 110 by allocating each column C of data chunks 330nD to a data center. Each chunk 330 within the column C can be allocated to a memory host 110 within a data center. Then, if X or fewer chunks 330 are lost at a data center, the chunks 330 can be reconstructed using only intra-data center communication (e.g., so no other data centers have to provide data 312 in performing reconstruction). If more than X chunks 330 are lost in one or more data centers, then the Y word-check chunks 330nWC are used to attempt reconstruction. Thus, inter-data center communication (which may be more expensive, e.g., slower than intra-data center communication) is only needed when more than X chunks 330 are damaged within a single data center.

The codes can also be used within a single data center. Instead of allocating different columns C to different data centers, the encoding system 102 stores all of the columns C at a single data center. The data chunks 330nD and code chunks 330nC can be stored at distinct memory hosts 110 within that data center. This is useful, for example, where reading data 312 from memory hosts 110 during reconstruction is expensive (e.g., time consuming), so that the encoding system 102 can read fewer chunks 330 during reconstruction than would be needed using conventional coding techniques. Small numbers of damaged chunks 330 can be reconstructed by reading small numbers of other chunks 330 (code-check chunks 330nCC and other data chunks 330nD in a column C), and large numbers of damaged chunks 330 can be reconstructed using the word-check chunks 330nWC when needed. In some examples, the curator 210 groups data chunks 330nD and certain non-data chunks 330nC in a group G in a manner that allows the system 100 to reconstruct missing chunks 330 from other chunks 330 of the group G. The group G may include one or more columns C or portions thereof.

Referring to FIGS. 3C-3G, in some implementations, a layered coding technique shows data chunks 330nD and code chunks 330nC forming codewords. An error-correcting code 313 is in systematic form if resulting codewords can be partitioned into two sets of chunks 330, one set including the data chunks 330nD and one set including the code chunks 330nC. A code in systematic form is Maximal Distance Separable (MDS) if it has N code chunks 330nC and it can correct any N damaged chunks 330. A layered code is created from two MDS codes, e.g., Reed-Solomon codes or parity codes, in systematic form. One code is used to create the code-check chunks 330nCC and the other code is used to create the word-check chunks 330nWC.

Figure 3F:
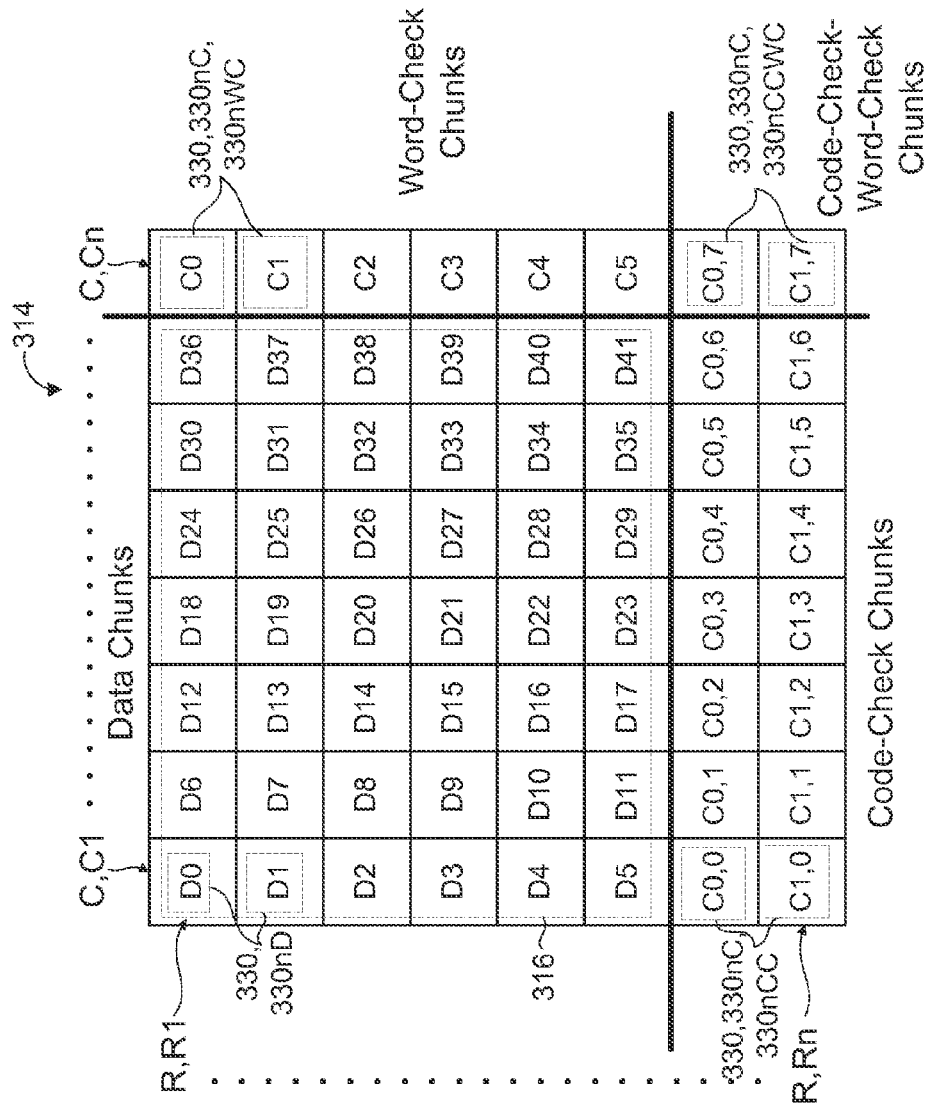

Referring to the example shown in FIGS. 3D-3F, a data block 316 includes data chunks 330nD labeled D0-D41 that are encoded with a layered code. In FIG. 3D, a first columns of data chunks 330nD is shown, D0-D5. Two code-check chunks 330nCC are shown for the columns, C0 and C1. C0 and C1 are based on D0-D5. Thus, D0-D5 and C0-C1 form a codeword. In FIG. 3E, an encoded data block 314 having the data block 314 (D0-D41) and six code chunks C0-C5 is shown. C0-C5 are based on D0-D41. Thus, D0-D41 and C0-C5 form a codeword.

FIG. 3F illustrates the resulting encoded data block 314 that includes the data block 314 (D0-D41) and additional code chunks 330nC (code-check chunks 330nCC and word-check chunks 330nWC). The i-th code-check chunk in column j is denoted Ci,j. So C0,0 and C1,0 are both code-check chunks 330nCC for D0-D5.

Together, D0-D5 and C0,0 and C1,0 form a codeword. The word-check chunks C0-C5 are shown in the last column to the right. Together, D0-D41 and C0-C5 form a codeword. C0,7 and C1,7 can be generated based on C0-C5, so that C0,7 and C1,7 and C0-C5 form a codeword.

In the example shown in FIG. 3F, the word-check chunks 330nWC fill a whole column C. However, layered codes can be created with an arbitrary number of full Columns C of word-check chunks 330nWC plus an optional partial column of word-check chunks 330nWC. If the data chunks 330nD and the word-check chunks 330nWC do not fill an integral number of columns C, empty zero-valued chunks 330 can be added to the 2D array. Those chunks 330 do not have to actually be stored and they would never be in error.

In general, a layered code with X code-check chunks $330nCC_k$ per column C and N word-check chunks 330nWC can reconstruct up to X damaged chunks 330 per column while performing only intra-column C communication. If after reconstructing those damaged chunks 330, N or fewer damaged chunks 330 remain in the 2D array (within the data plus word-check chunks 330nWC portion of the 2D array), the damaged chunks 330 can be reconstructed using the word-check chunks 330nWC and the code-check chunks 330nCC. This is true because N or fewer damaged chunks 330 in the data chunks 330nD plus the word-check chunks 330nWC can be reconstructed using only the word-check chunks 330nWC. Then, if any code-check chunks $330nCC_k$ are damaged, they can be reconstructed from the data chunks 330nD of their respective column C.

Figure 3G:
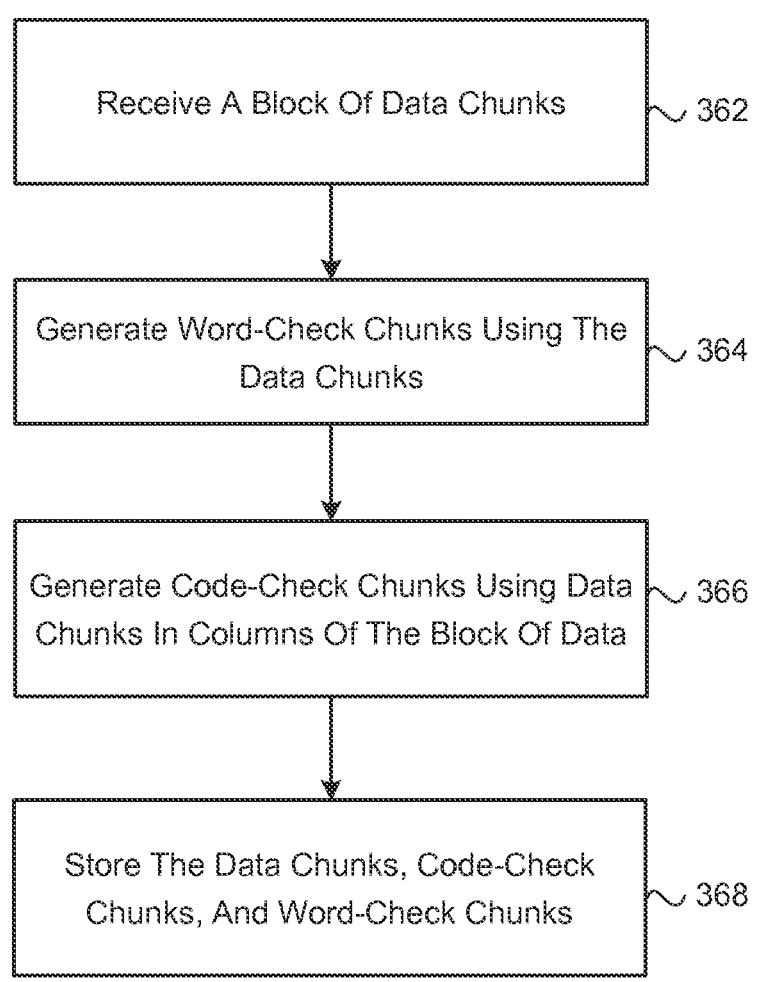
FIG. 3G is an exemplary arrangement of operations for storing data using layered coding techniques.

Referring to FIG. 3G, in some implementations, the curator 210 distributes data 312 using a layered code. The curator 210 receives a data block 316 that includes data chunks 330nD (step 362). For example, the data block 316 can be from a file 310 that is being stored. The data block 316 can include $m_d * n_d$ data chunks 330nC, $m_d$ is a number of data rows and $n_d$ is a number of data columns, and $m_d$ and $n_d$ are greater than or equal to one. The encoded block 314 includes m*n chunks 330 that include $m_d * n_d$, where m is the total number of rows R of data chunks 330nD and non-data chunks 330nC, and n is the number of columns C of data chunks 330nD and non-data chunks 330nC; nm and n are greater than or equal to one. The curator 210 generates one or more columns C of word-check chunks 330nWC using a first error-correcting code 313 in systematic form and the data chunks 330nD (step 364). The columns C of word-check chunks 330nWC can have different numbers of word-check chunks 330nWC in the column C. The data chunks 330nD and the word-check chunks 330nWC, taken together, form a codeword.

For each column C of one or more columns C of the data chunks 330nD, the curator 210 generates one or more code-check chunks 330nCC for the column C using a second error-correcting code 313 in systematic form and the data chunks 330nD of the column C (step 366). The first and second error-correcting codes 313 can be distinct. The columns C can have different numbers of code-check chunks 330nCC. The system 100 can also generate code-check chunks 330nCC for the column C of word-check chunks 330nWC. The system 100 stores the data chunks 330nD, code-check chunks 330nCC, and word-check chunks 330nWC (step 368). In some implementations, the system 100 allocates each columns C and/or the code-check chunks 330nCC within a column C to a distinct group of memory host 110. In other implementations, the system 100 stores the data chunks 330nD and the code chunks 330nC at a same group of memory host 110, e.g., a single data center. The system 100 may group data chunks 330nD and certain code-check chunks 330nCC, and word-check chunks 330nWC in groups G where an unhealthy chunk 330 can be restored from one or more other chunks 330 of the group G. Therefore, the system 100 stores chunks 330 of a group G at different memory hosts 110.

When the system allocates a column C of chunks 330 to a group of memory hosts 110, the code-check chunks 330nCC can be generated at different locations. For example, the code-check chunks 330nCC can be generated by a central encoding system (e.g., the server 202 of FIG. 1B) that performs the allocation or by the group of memory hosts 110 after receiving a column C of data chunks 330nD. At each group of memory hosts 110, each of the allocated data chunks 330nD, code-check chunks 330nCC, and word-check chunks 330nWC can be stored at a distinct memory host 110.

When the system 100 identifies a damaged data chunk 330nD at a first group of memory hosts 110, the system 100 attempts to reconstruct the damaged chunk 330 without communication with other groups of memory hosts 110 (using the code-check chunks 330nCC) of the group G of chunks 330. In some cases, the system 100 reconstructs as many other damaged data chunks 330nD from the group G of chunks 330 at the first group of memory hosts 110 as is possible using the code-check chunks 330nCC and any healthy data chunks 330nD allocated to the first group of memory hosts 110 from the group G of chunks 330. If the system 100 determines that the damaged chunk 330 cannot be reconstructed without communicating with other groups of memory hosts 110 that have other groups G of chunks 330, the system identifies (e.g., by requesting and receiving) healthy chunks 330 from other groups of memory hosts 110 that have other groups G of chunks 330 so that at least m*n healthy chunks 330 are available, where the healthy chunks 330 are data chunks 330nD, word-check chunks 330nWC, or both, and reconstructs the damaged data chunk 330nD using the healthy chunks 330.

Figure 3H:
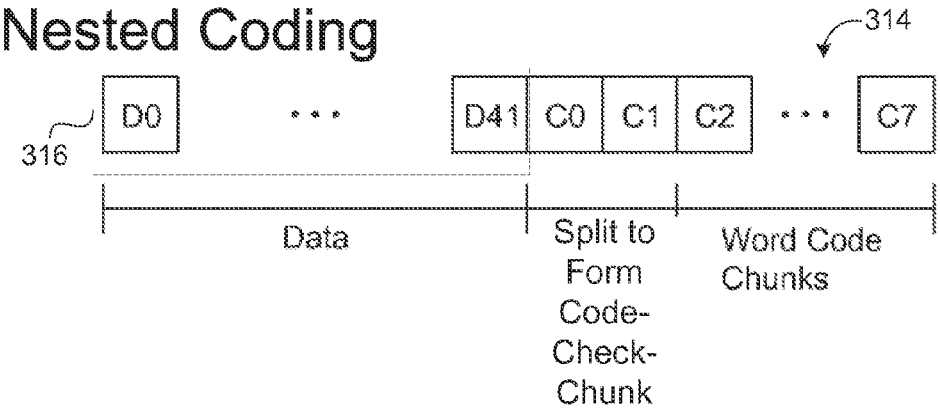
FIGS. 3H-3J are schematic views of exemplary nested coding techniques.
Figure 3I:
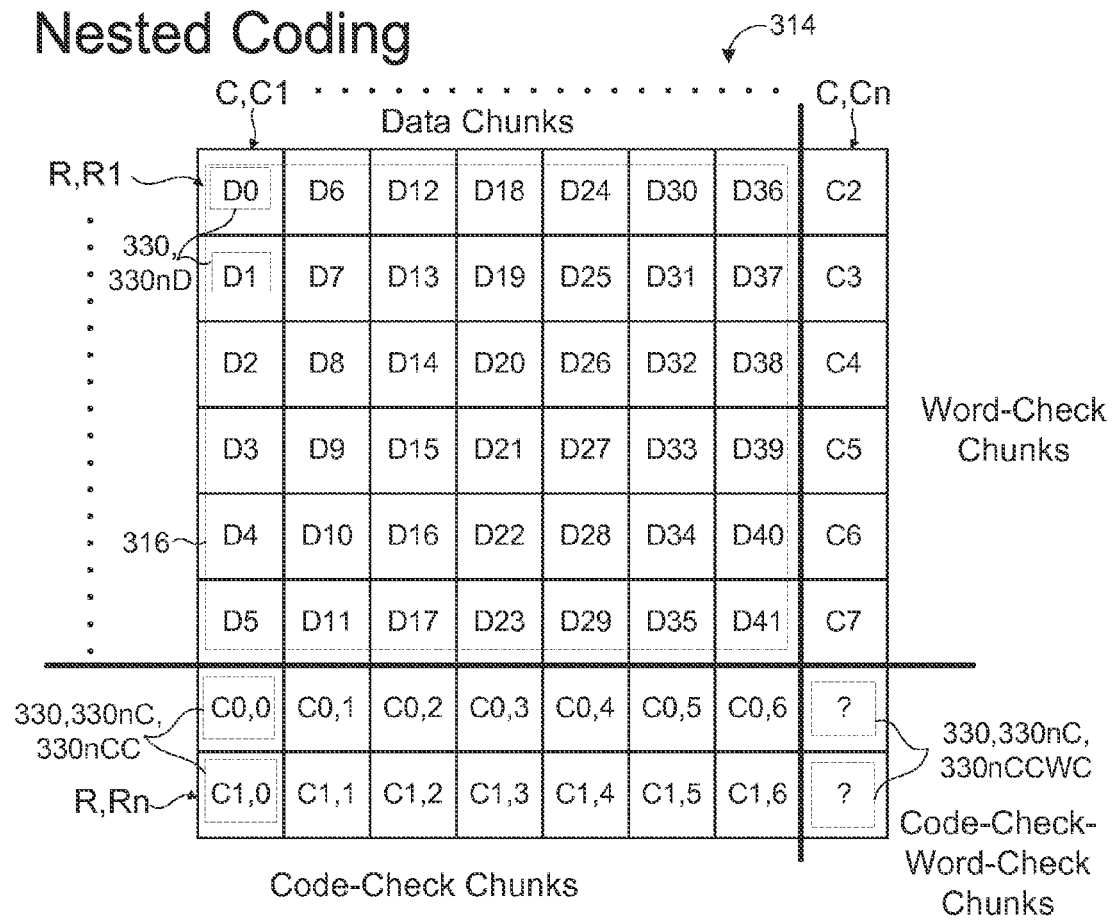
Figure 3J:
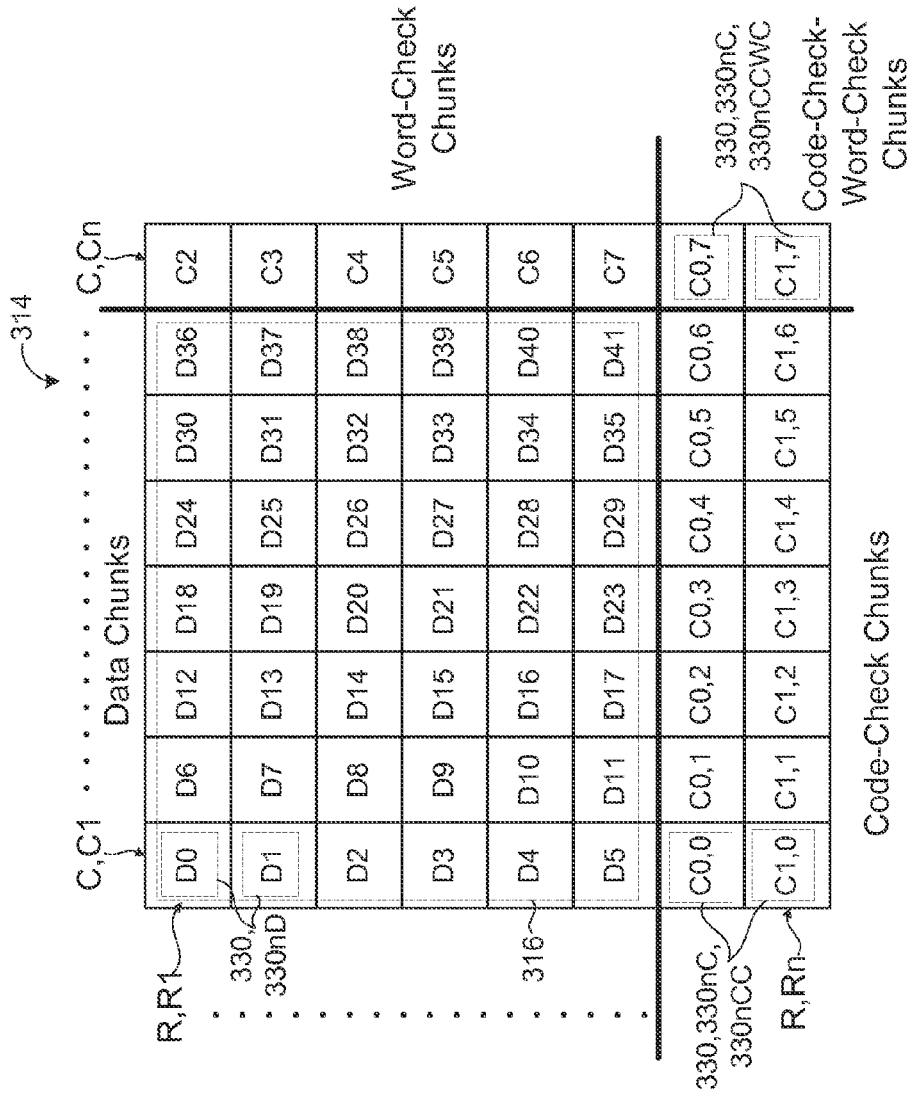

Referring to FIGS. 3H-3J, in some implementations, a nested coding technique shows data chunks 330nD and code chunks 330nC that form a codeword. As shown, the nested coding technique is a two dimensional (2D) nested coding technique, but a three dimensional (3D) nested coding technique may also be applied.

Nested coding techniques differ from layered coding techniques by creating a different relationship between the code-check chunks 330nCC and the word-check chunks 330nWC. A 2D nested code is created from an arbitrary linear MDS code in systematic form. Word-check chunks 330nWC that are based on a data block 316 are partitioned into two groups, the first group including X code chunks 330nC and the second group including N code chunks 330nC. The encoded data block 316 is viewed as forming an array of columns C, and X code chunks 330nC in the first group are used to create X column chunks 330 per column by "splitting" them into separate components per column ("split" code-check chunks 330nCC). The N code chunks 330nC in the second group form word-check chunks 330nWC.

For example, FIG. 3H shows a data block 314 (D0-D41) and code chunks (C0-C7) 330nC that are based on the data block 316 (D0-D41). The data chunks (D0-D41) 330nD and the code chunks (C0-C7) 330nC form a codeword. The code chunks 330nC are partitioned into a first group that includes C0-C1 and a second group that includes C2-C7. C0-C1 are split to form split code-check chunks 330nCC. C2-C7 are used as word-check chunks 330nWC.

FIG. 3I shows a resulting encoded block 314 that includes the data block 316 (D0-D41) and additional code chunks 330nC (split code-check chunks 330nCC and word-check chunks 330nWC). To generate a split code-check chunk 330nCC corresponding to C0 for column j (denoted C0,j), C0 is generated as though all the data chunks 330nD not in column j have the value zero. That is, C0,j has the value that would result from performing the operations to generate C0 using the full data block 316 but instead using only the column j, with all of the other columns zeroed out. For example, if a generator matrix would be used to generate C0 for the data block 314, then the generator matrix can be modified to generate C0,j so that it has the value that would result from using the original generator matrix and applying that original generator matrix to the data block 316 with data chunks 330nD in columns C other than column j zeroed out.

The split code-check chunks 330nCC for C1,j for each column C are generated similarly, but using C1 instead of C0. As a result, C0 is a linear combination of C0,0-C0,6 and C1 is a linear Combination of C1,0-C1,6. That is, $$C0 = \Sigma_{j=0}^{6} C0,j; \qquad (1)$$

and $$C1 = \Sigma_{j=0}^{6} C1,j. \qquad (2)$$

The chunks 330 denoted as "?" in FIG. 3I can be generated in various ways, e.g., as described further below with reference to FIG. 3J.

In the example of FIGS. 3H and 3I, the resulting encoded data block 314 includes 42 data chunks 330nD and 8 code chunks 330nC. Referring to the original code used to create the encoded block, the code chunks 330nC belong to one of two groups as described above, X=2 of which are in the first group and N=6 of which are in the second group. Whenever there are two or fewer (X or fewer) damaged chunks 330 within one of the first seven columns, the damaged chunks 330 can be corrected using the healthy chunks 330 of the columns C and the split code-check chunks 330nCC for the column C. To see this, let j denote the column C including the two or fewer damaged chunks 330 and consider the codeword obtained by zeroing-out all the data chunks 330nD from columns C other than j. In that codeword, C0=C0,j and C1=C1,j. As a result, the two or fewer damaged chunks 330 in other columns as containing all-zero data chunks 330nD, and by viewing the word-check chunks 330nWC as being damaged.

In the example shown in FIG. 3F, the word-check chunks 330nWC fully fill an entire column C (the column to the right). 2D nested codes 313b can be created with an arbitrary number of columns C of word-check chunks 330nWC. The columns C of word-check chunks 330nWC can have the same number of rows R as the columns of data chunks 330nD or different numbers of rows R, and the columns C of word-check chunks 330nWC can have different numbers of rows R from each other. Columns C of word-check chunks 330nWC can, but do not have to, have code-check chunks 330nCC, i.e., code-check-word-check chunks 330nCCWC. Increasing the number of word-check chunks 330nWC improves the reliability of the stored data 312 but uses more storage at memory hosts 110. In general, for nested codes columns C include either data chunks 330nD or word-check chunks 330nWC and not both.

In general, a 2D nested code with X split code-check chunks 330nCC per column C and N word-check chunks 330nWC can be used to reconstruct X damaged chunks 330 per column C (in those columns that include data chunks 330nD) while performing only intra-columns communication (which is typically, e.g., intra-data center communication). In reconstructing multiple damaged chunks 330 within the encoded block 314, those damaged chunks 330 are typically reconstructed first because intra-column communication is less expensive than inter-column communication, but other damaged chunks 330 may remain. If, after reconstructing damaged chunks 330 within columns, (N+X) or fewer other chunks 330 are still damaged (because they were not able to be reconstructed using intra-column communication), those other damaged chunks 330 can be reconstructed using the word-check chunks 330nWC and the split code-check chunks 330nCC. The word-check chunks 330nWC in the first group (C0 and C1 in FIG. 4B) can be determined from the split code-check chunks 330nCC, e.g., using the formula $Ci = \Sigma_{j=0}^{6} C\ i,j$, even though those word-check chunks 330nWC are not explicitly stored.

To see this, let Z denote the number of word-check chunks 330nWC that are damaged and let Y denote the number of word-check chunks 330nWC in the first group that cannot be reconstructed from their corresponding split code-check chunks 330nCC according to the formula $C_i = \Sigma_{j=0}^{6} C\, 0,j$ to split code-check chunks 330nCC being damaged. Using that formula, X–Y word-check chunks 330nWC from the first group can be determined, resulting in a codeword (e.g., the one shown in FIG. 3H) with Y damaged word-check chunks 330nWC in the first group and Z damaged word-check chunks 330nWC in the second group. Because there are at most N+X total damaged chunks 330, there are at most N+X-Y-Z damaged data chunks 330nD. Thus, it is possible to use the resulting codeword to reconstruct all of the damaged chunks 330, as it includes at most N+X–Y–Z+Y+Z=N+X damaged chunks 330.

Referring to FIG. 3J, in some implementations, a resulting encoded block 314 includes code-check chunks 330nCC for the word-check chunks 330nWC (i.e., code-check-word-check chunks 330nCCWC). Compared to the encoded block of FIG. 3I, the encoded block 314 of FIG. 3J includes the code-check chunks C0,7 and C1,7 330nCC in place of the locations marked with "?" in FIG. 3I. This is one way to provide for reconstructing damaged word-check chunks 330nWC without relying on inter-column communication. The code-check chunks C0,7 and C1,7 330nCC can be generated in various ways. For example, those code-check chunks 330nCC can be generated based on C2–C7 in the same manner that C0,0 and C1,0 are generated based on D0–D5. The resulting encoded block 314 of FIG. 3J (using the example nested code) can be used to reconstruct up to eight damaged chunks 330 after performing intra-column reconstruction, whereas the resulting encoded block of FIG. 3E (using the example layered code) can be used to reconstruct up to six damaged chunks 330 after performing intra-column reconstruction. Code-check chunks 330nC can be added for any number of columns that include word-check chunks 330nWC.

Figure 3K:
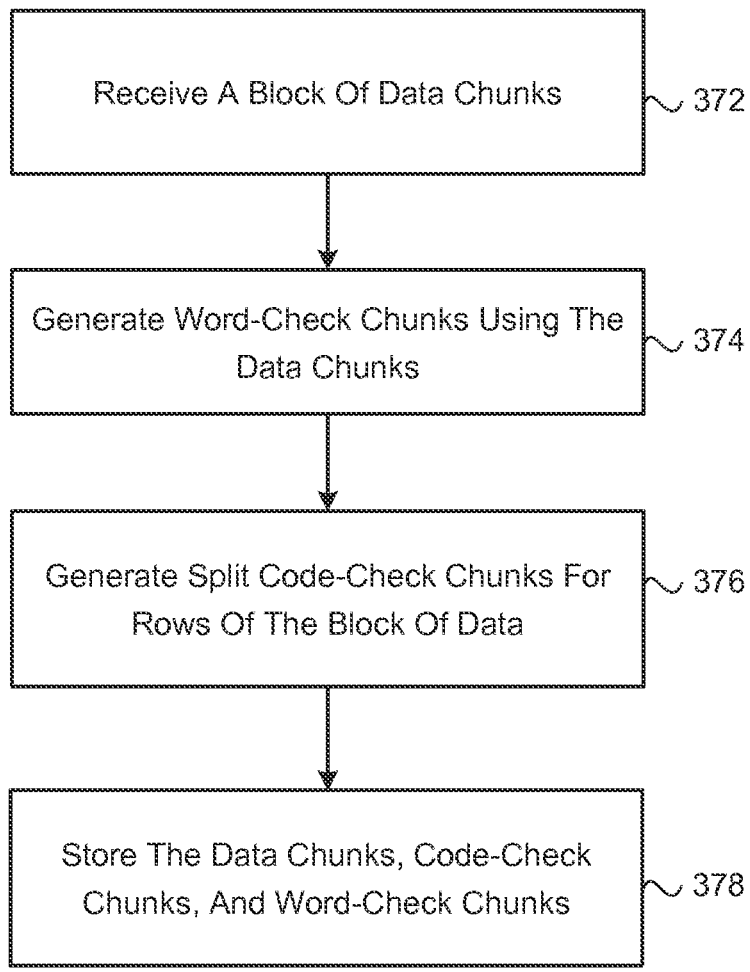
FIG. 3K is an exemplary arrangement of operations for storing data using nested coding techniques.

Referring to FIG. 3K, in some implementations, the curator 210 distributes data 312 using a nested code 313b. The system 100 receives a data block 316 (step 372). The data block 316 can include $m_d*n_d$ data chunks 330nC, $m_d$ is a number of data rows and $n_d$ is a number of data columns, and $m_d$ and $n_d$ are greater than or equal to one. The encoded block 314 includes m*n chunks 330 that include $m_d*n_d$, where m is the total number of rows R of data chunks 330nD and non-data chunks 330nC, and n is the number of columns C of data chunks 330nD and non-data chunks 330nC; m and n are greater than or equal to one. The system 100 generates one or more columns C of word-check chunks 330nWC using a first linear error-correcting code 313 in systematic form and the data chunks 330nD (step 374). The word-check chunks 330nWC and the data chunks 330nD of the same row R form a codeword. For each of $m_d$ row of data chunks 330nC, the system 100 generates one or more split code-check chunks 330nCC for the Column C (step 376). The split code-check chunks 330nCC are generated so that a linear combination of n split code-check chunks 330nCC from different columns C forms a first word-check chunk 330nWC of a first codeword including the data chunks 330nD and the m word-check chunks 330nWC. The first word-check chunk 330nWC (and any other word-check chunks 330nWC resulting from a linear combination of split code-check chunks 330nCC from different columns C) forms a codeword with the data chunks 330nD and the word-check chunks 330nWC generated in step 374. For example, the split code-check chunks 330nCC for each columns C can be generated using a splitting error-correcting code 313 and the $m_d$ data chunks 330nD or the word-check chunks 330nWC, wherein the splitting error-correcting code 313 includes a splitting generator matrix that codes the same as a generator matrix for the first linear error-correcting code 313 applied to the data chunks 330nD with the data chunks 330nD zeroed-out for columns C other than the column C.

The system 100 stores the column C of data chunks 330nD and the split code-check chunks 330nCC and the word-check chunks 330nWC (step 378). In some implementations, the system 100 stores all the chunks 330 at a single group of memory hosts 110. In some other implementations, the system 100 allocates each column C to a distinct group of memory hosts 110. In some implementations, the system 100 groups chunks 330 capable of being reconstructed from other chunks 330 within the group G, and allocates the chunks 330 of the group G to distinct groups of memory hosts 110.

When the system 100 identifies one or more damaged chunks 330, the system 100 can reconstruct the damaged chunks 330 using the split code-check chunks 330nCC and the word-check chunks 330nWC. Typically, the system 100 attempts to reconstruct damaged chunks 330 using the split code-check chunks 330nCC and other data chunks 330nd in the same column C. If, after reconstructing damaged chunks 330 using only the split code-check chunks 330nCC, some damaged chunks 330 remain, the system 100 uses the word-check chunks 330nWC for reconstruction, including the word-check chunks 330nWC that can be determined by determining a linear combination of the split code-check chunks 330nCC. In addition, if after reconstructing damaged chunks 330 using only split code-check chunks 330nCC of chunks 330 of a group G, some damaged chunks 330 remain, the system 100 uses chunks 330 from other groups G of chunks 330 to reconstruct the damaged chunks 330.

Referring back to FIG. 2, in some implementations, file descriptors $300_{1-n}$, stored by the curator 210 contain metadata 212, such as the file map 214, which maps the stripes 320a-n to data chunks $320nd_k$ and non-data chunks $320nc_m$, as appropriate, stored on the memory hosts 110. To open a file 310, a client 120 sends a request 122 to the curator 210, which returns a file descriptor 300. The client 120 uses the file descriptor 300 to translate file chunk offsets to remote memory locations 115a-n. The file descriptor 300 may include a client key 302 (e.g., a 32-bit key) that is unique to a chunk 330 on a memory host 110 and is used to RDMA-read that chunk 330. After the client 120 loads the file descriptor 300, the client 120 may access the data 312 of a file 310 via RDMA or another data retrieval method.

The curator 210 may maintain status information for all memory hosts 110 that are part of the cell 200. The status information may include capacity, free space, load on the memory host 110, latency of the memory host 110 from a client's point of view, and a current state. The curator 210 may obtain this information by querying the memory hosts 110 in the cell 200 directly and/or by querying a client 120 to gather latency statistics from a client's point of view. In some examples, the curator 210 uses the memory host status information to make rebalancing, draining, recovery decisions, and allocation decisions.

The curator(s) 210 may allocate chunks 330 in order to handle client requests 122 for more storage space in a file 310 and for rebalancing and recovery. The curator 210 may maintain a load map 216 of memory host load and liveliness. In some implementations, the curator 210 allocates a chunk 330 by generating a list of candidate memory hosts 110 and sends an allocate chunk request 122 to each of the candidate memory hosts 110. If the memory host 110 is overloaded or has no available space, the memory host 110 can deny the request 122. In this case, the curator 210 selects a different memory host 110. Each curator 210 may continuously scan its designated portion of the file namespace, examining all the metadata 212 every minute or so. The curator 210 may use the file scan to check the integrity of the metadata 212, determine work that needs to be performed, and/or to generate statistics. The file scan may operate concurrently with other operations of the curator 210. The scan itself may not modify the metadata 212, but schedules work to be done by other components of the system 100 and computes statistics.

In some implementations, the processor 202 may group one or more of the data chunks 330nD and one or more of the non-data chunks 330nC in a group G. The one or more chunks 330 of the group G are capable of being reconstructed from other chunks 330 of the group G. Therefore, when reconstructing chunks 330 of a group G, the curator 210 reads chunks 330 of the group G to reconstruct damaged chunks 330 within the group G. This allows more efficient reconstruction of missing chunks 330, and the number of chunks 330 being read is reduced. Specifically, reducing the number of chunk reads can decrease the cost of the read, since fewer reads to hardware devices (e.g., memory hosts 114) are performed, and reduce the latency of the reconstruction since slow devices are less likely to be accessed.

Figure 4A:
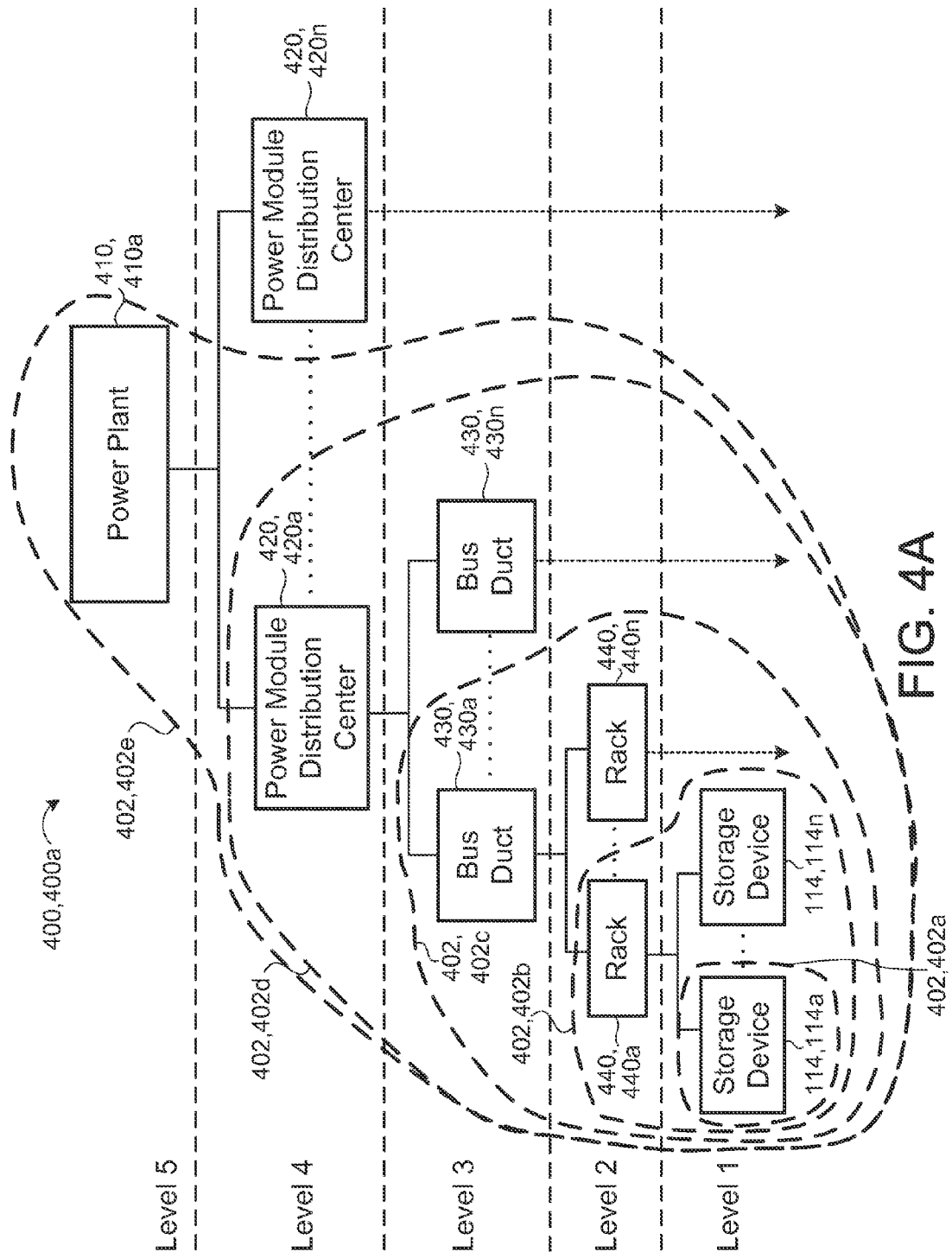
FIGS. 4A-4C are schematic views of an exemplary maintenance hierarchy.
Figure 4B:
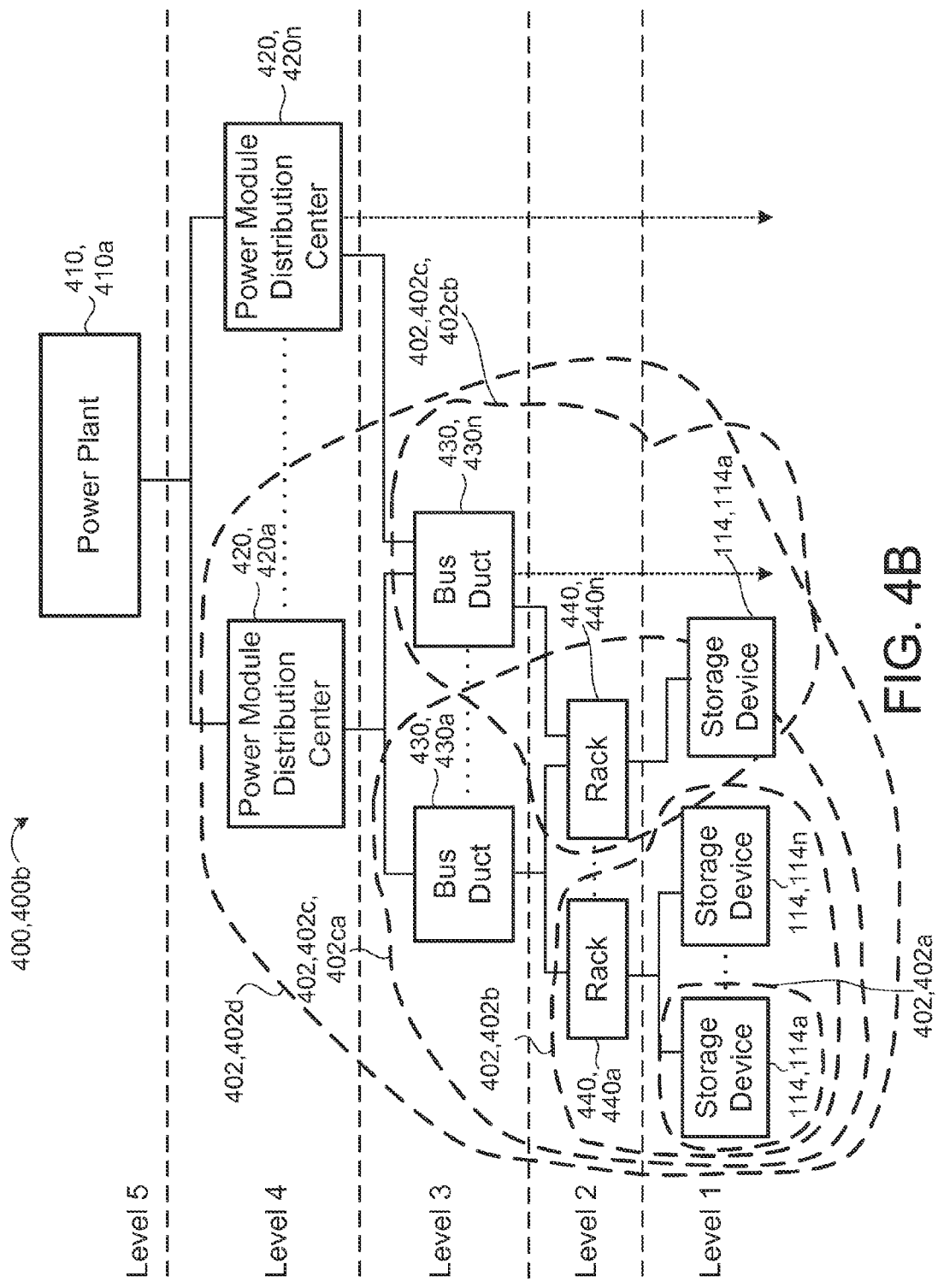
Figure 4C:
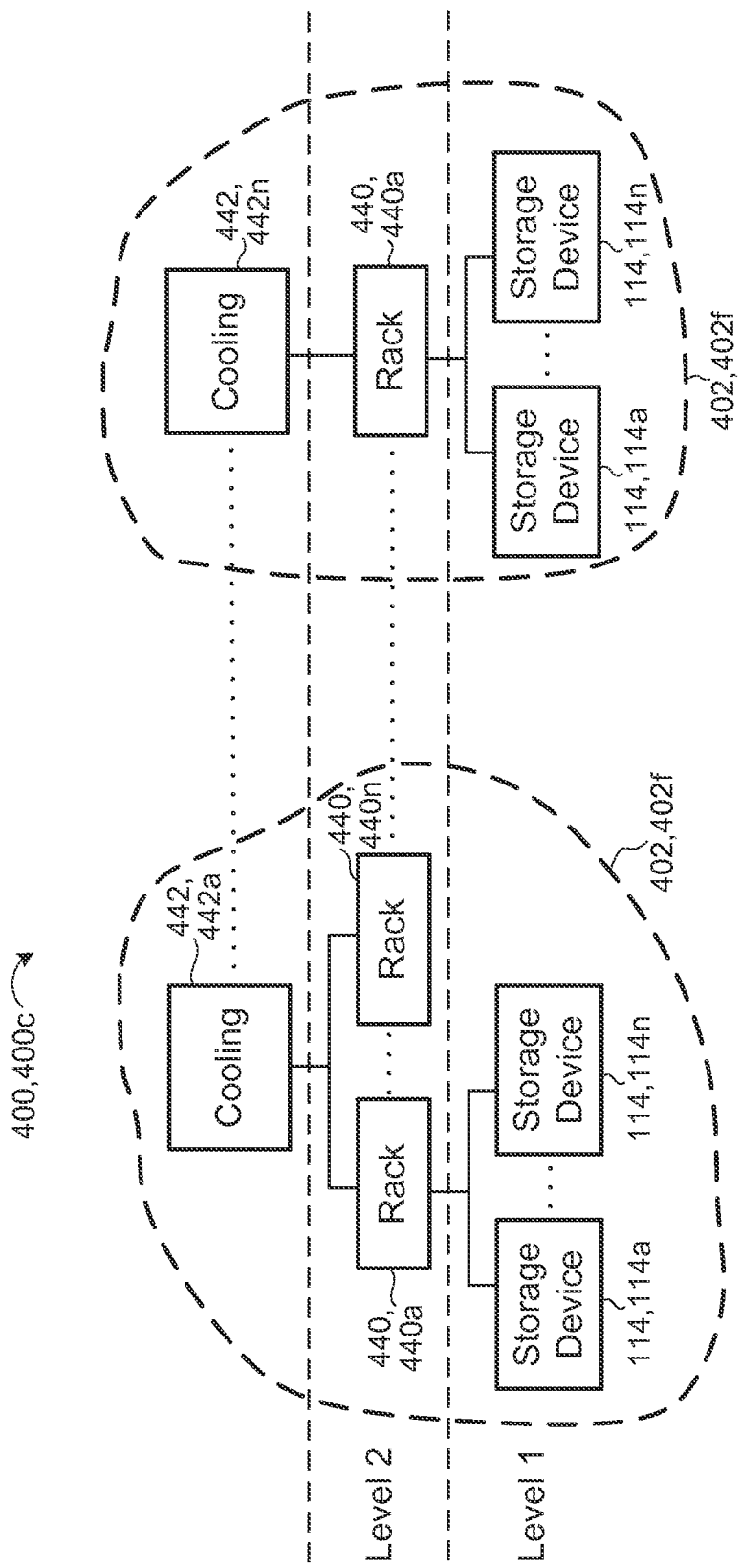

Referring to FIGS. 4A-4C, the curator 210 may determine a maintenance hierarchy 400 of the distributed storage system 100 to identify the levels (e.g., levels 1-5) at which maintenance may occur without affecting a user's access to stored data 312. Maintenance may include power maintenance, cooling system maintenance (FIG. 4C), networking maintenance, updating or replacing parts, or other maintenance or power outage affecting the distributed storage system 100.

The maintenance hierarchy 400 identifies levels (e.g., levels 1-5) of maintenance domains 402, where each maintenance domain 402 may be in an active state or an inactive state. Each memory host 110 of the distributed storage system 100 is associated with one or more maintenance domain 402. Moreover, the processor 202 maps the association of the memory hosts 110 with the maintenance domains 402 and their components 410, 420, 430, 440, 114. FIG. 4A shows a strict hierarchy 400a where each component 410, 420, 430, 440, 114, depends on one other component 410, 420, 430, 440, 114, while FIG. 4B shows a non-strict hierarchy 400b where one component 410, 420, 430, 440, 114 has more than one input feed. In some examples, the processor 202 stores the maintenance hierarchy 400 on the non-transitory memory 204 of the processor 202. For example, the storage resource 114a is mapped to a rack 440a, which is mapped to a bus duct 430a, which in turn is mapped to a power module distribution center 420a, which in turn is mapped to a power plant 410a. The processor 202 determines, based on the mappings of the components 410, 420, 430, 440, 114, what memory hosts 110 are inactive when a component 410, 420, 430, 440, 114 is undergoing maintenance. Once the system 100 maps the maintenance domains 402 to the storage resources 114, the system 100 determines a highest level (e.g., levels 1-5) at which maintenance can be performed while maintaining data availability.

A maintenance domain 402 includes a component 410, 420, 430, 440, 114 undergoing maintenance and any components depending from that component 410, 420, 430, 440, 114. Therefore, when one component 410, 420, 430, 440, 114 is undergoing maintenance that component 410, 420, 430, 440, 114 is inactive and any component 410, 420, 430, 440, 114 in the maintenance domain 402 of the component 410, 420, 430, 440, 114 is also inactive. As shown in FIG. 4A, level 1 components may include the storage resources 114a-n; level 2 components may include racks 440a-n; level 3 components may include bus ducts 430a-n; level 4 components may include power module distribution centers 420a-420n; and level 5 components may be the power plants 410 providing power to levels 1 to 4 components. Other component distribution may also be available. When a memory host 110a is undergoing maintenance, a level 1 maintenance domain 402a includes the memory host 110 and that storage device 114 is inactive. When a rack 440a is undergoing maintenance, a level 2 maintenance domain 402b that includes the rack 440a and memory hosts 110 depending from the rack 440a are in an inactive state. When a bus duct 430a is undergoing maintenance, a level 3 maintenance domain 402c that includes the bus duct 430a and any components in levels 1 and 2 that depend from the bus duct 430a are in an inactive state. When a power module distribution center 420a is undergoing maintenance, a level 4 maintenance domain 402d that includes the power module distribution center 420a and any components in levels 1 to 3 depending from the power module distribution center 420a are in an inactive state. Finally, when the power plant 410 is undergoing maintenance, a level 5 maintenance domain 402e including any power module distribution centers 420, bus ducts 430, racks 440, and memory hosts 110 depending on the power plant 410 are inactive, and therefore a user cannot access data 312 located within the level 1 maintenance domain 402a.

In some examples, as shown in FIG. 4B, a non-strict hierarchy 400b component 410, 420, 430, 440, 114 has dual feeds, i.e., the component 410, 420, 430, 440, 114 depends on two or more other components 410, 420, 430, 440, 114. For example, a bus duct 430n may have a feed from two power modules 420; and/or a rack 440 may have a dual feed from two bus ducts 430. As shown, a first maintenance domain 402c may include two racks 440a and 440n, where the second rack 440n includes two feeds from two bus ducts 430a, 430n. Therefore, the second rack 440n is part of two maintenance domains 402ca and 402cb. Therefore, the higher levels of the maintenance hierarchy 400 are maintained without causing the loss of the lower levels of the maintenance hierarchy 400. This causes a redundancy in the system 100, which allows for data accessibility. In particular, the power module distribution center 420 may be maintained without losing any of the bus ducts 430 depending from it. In some examples, the racks 440 include a dual-powered rack 440 that allows the maintenance of the bus duct 430 without losing power to the dual-powered racks 440 depending from it. In some examples, maintenance domains 402 that are maintained without causing outages are ignored when distributing chunks 330 to allow for maintenance; however, the ignored maintenance domains 402 may be included when distributing the chunks 330 since an unplanned outage may still cause the loss of chunks 330.

In some examples, as shown in FIG. 4C, the maintenance hierarchy 400 is a cooling hierarchy 400c (or a combination of a power hierarchy 400a, 400b) and a cooling hierarchy 400c. The cooling hierarchy 400c maps a cooling device 442 to the racks 440 that it is cooling. As shown, a cooling device 442 may cool one or more racks 440. The processor 202 stores the association of the memory hosts 110 with the cooling maintenance domains 402f. In some implementations, the processor 202 considers all possible combinations of maintenance that might occur within the storage system 100 to determine a hierarchy 400 or a combination of hierarchies 400a, 400b, 400c.

Therefore, when a component 410, 420, 430, 440, 114 in the storage system 100 is being maintained that component 410, 420, 430, 440, 114 and any components 410, 420, 430, 440, 114 that are mapped to or depending from that component 410, 420, 430, 440, 114 are in an inactive state. A component 410, 420, 430, 440, 114 in an inactive state is inaccessible by a user, while a component 410, 420, 430, 440, 114 in an active state is accessible by a user allowing a user to access data 312 stored on that component 410, 420, 430, 440, 114 or on a memory host 110 mapped to that component 410, 420, 430, 440, 114. As previously mentioned, during the inactive state, a user is incapable of accessing the memory hosts 110 associated with the maintenance domains 402 undergoing maintenance; and therefore, the user is incapable of accessing the files 310 (i.e., chunks 330, which include stripe replicas $330n_k$, data chunks $330nD_k$, and code chunks $330nC_m$).

In some implementations, the processor 202 restricts a number of chunks 330 within a group G that are distributed to memory hosts 110 of any one maintenance domain 402, e.g., based on the mapping of the components 410, 420, 430, 440, 114. Therefore, if a level 1 maintenance domain 402 is inactive, the processor 202 maintains accessibility (i.e., the unhealthy chunks 330 can be reconstructed) to the group G although some chunks 330 may be inaccessible. In some examples, for each group G of chunks 330, the processor 202 determines a maximum number of chunks 330 that are placed within any memory host 110 within a single maintenance domain 402, so that if a maintenance domain 402 associated with the memory host 110 storing chunks 330 for a file 310 is undergoing maintenance, the processor 202 may still retrieve the chunks 330 within the group G. The maximum number of chunks 330 ensures that the processor 202 is capable of reconstructing the number of chunks 330 of the group G although some chunks 330 may be unavailable. In some examples, the maximum number of chunks 330 of a group G is set to a lower threshold to accommodate for any system failures, while still being capable of reconstructing the group G of chunks 330. When the processor 202 places chunks 330 on the memory hosts 110, the processor 202 ensures that within a group G of chunks 330 of a stripe 320, no more than the maximum number of chunks 330 are inactive when a single maintenance domain 402 undergoes maintenance.

Referring to FIGS. 5A-7B, in some implementations, the processor 202 determines a distribution of the chunks 330 of a group G among the memory hosts 110. In some examples, the processor 202 makes a first random selection 150 of memory hosts 110 from an available pool of storage devices 140 to store the chunks 330 of a group G. The processor 202 selects a number of memory hosts 110 (e.g., selected memory host 110S) equal to the number of chunks 330 in the group G. Next, the processor 202 determines if the selection 150 of selected memory hosts 110S is capable of maintaining accessibility of the group G (i.e., the chunks 330 of the group G are available) when one or more (or a threshold number of) maintenance domains 402 are in an inactive state. The random selection 150 has the goal of allowing reconstruction of the group G if maintenance occurs on one of the maintenance components 410, 420, 430, 440, 114.

Figure 5A:
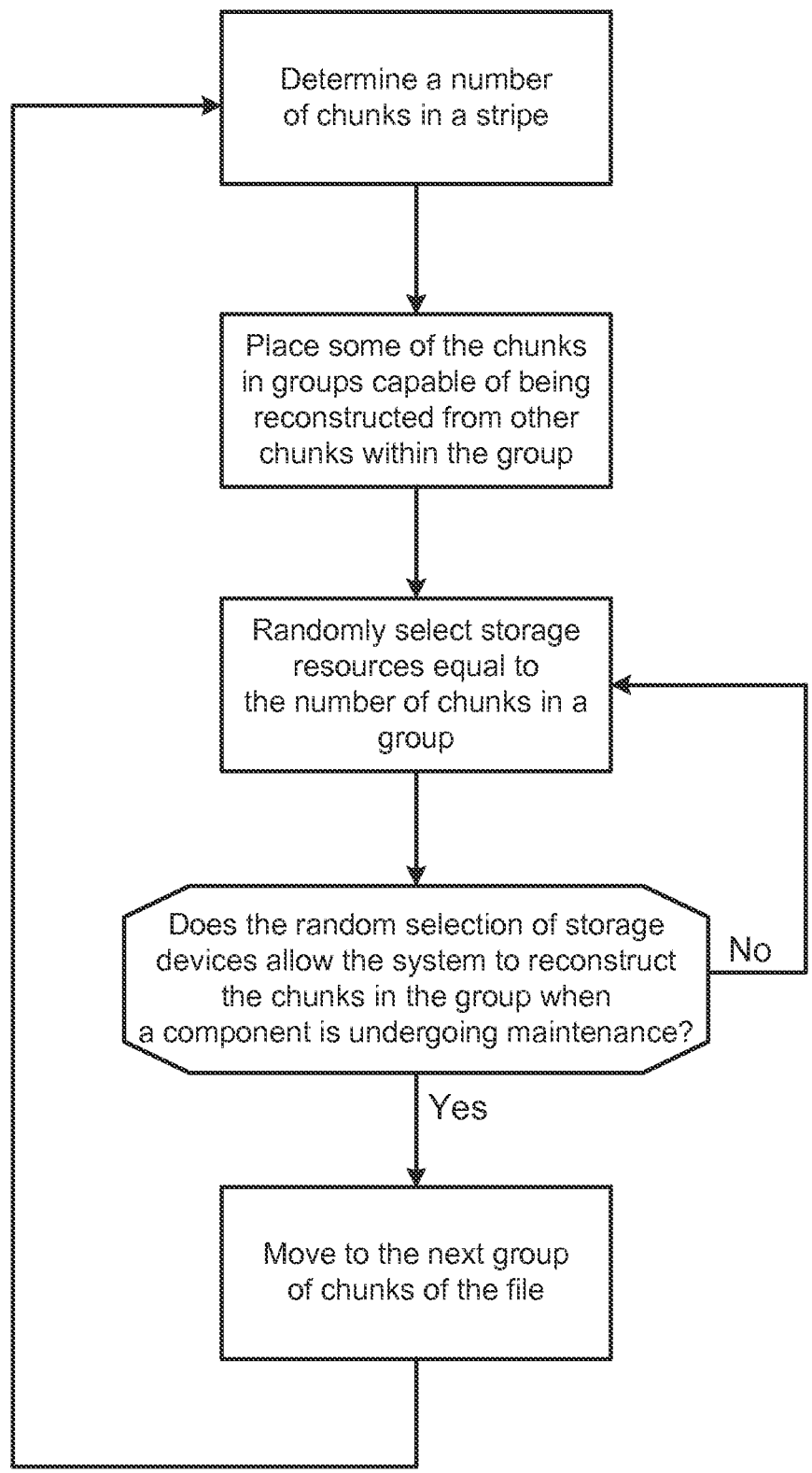
FIG. 5A is a flow chart of an exemplary arrangement of operations for randomly selecting a group of storage resources.
Figure 5B:
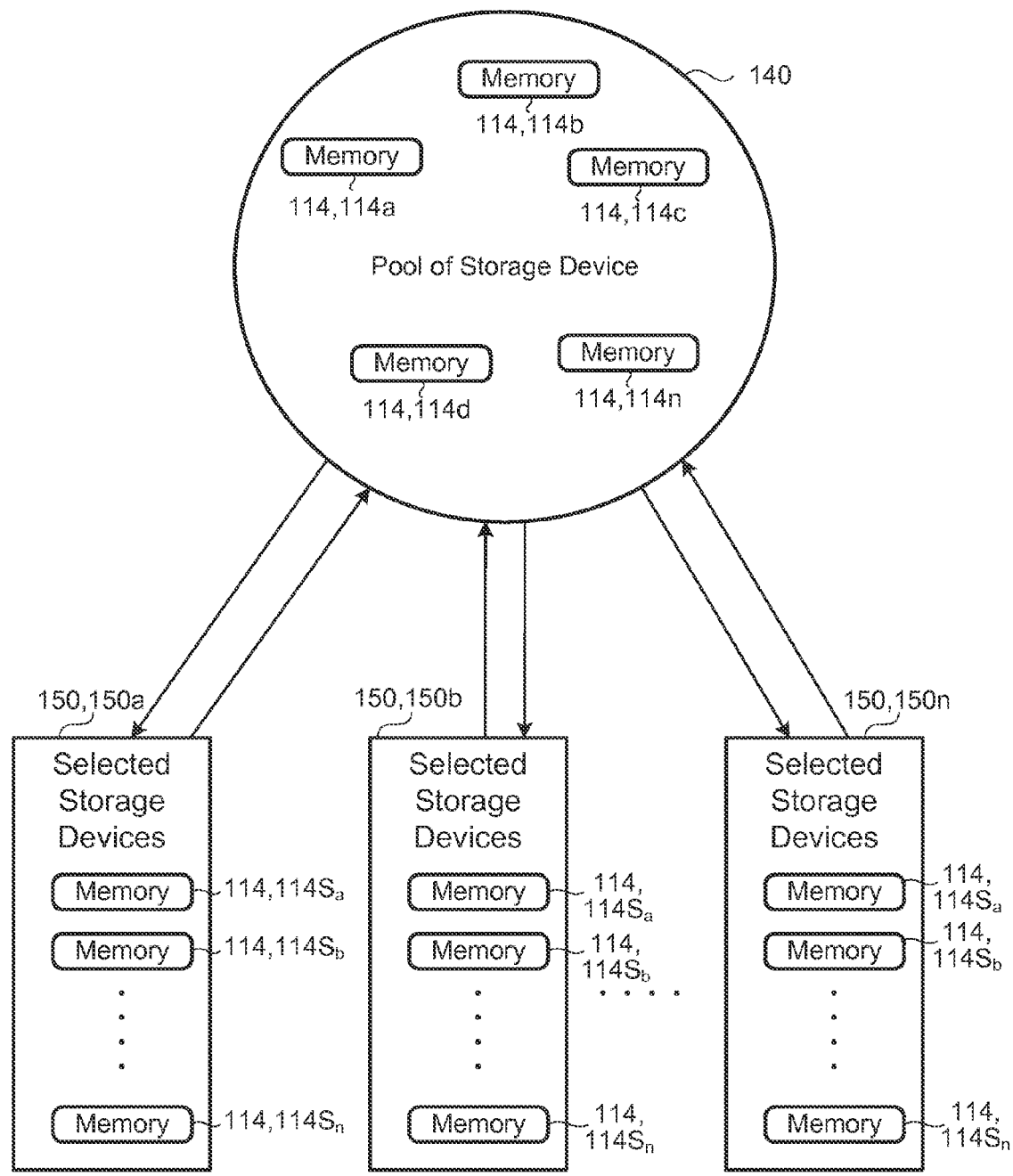
FIG. 5B is a schematic view of an exemplary random selection of storage devices.

Referring to FIGS. 5A and 5B, in some examples, when the processor 202 determines that the first random selection 150a of selected memory hosts 110S is incapable of maintaining accessibility of the group G when one or more (or a threshold number of) maintenance domains 402 are in an inactive state, the processor 202 determines a second random selection 150b of selected memory hosts 110S that matches the number of chunks 330 of the group G. Then, the processor 202 determines if the second random selection 150b of selected memory hosts 110S is capable of maintaining accessibility of the group G when one or more (or a threshold number of) maintenance domains 402 are in an inactive state. If the processor 202 determines that the second random selection 150b is incapable of maintaining accessibility of the group G when one or more (or a threshold number of) maintenance domains 402 are in an inactive state, the processor 202 continues to make random selections 150n of selected memory hosts 110S until the processor 202 identifies a random selection 150n of selected memory hosts 110S that is capable of maintaining accessibility of the group G.

Figure 6A:
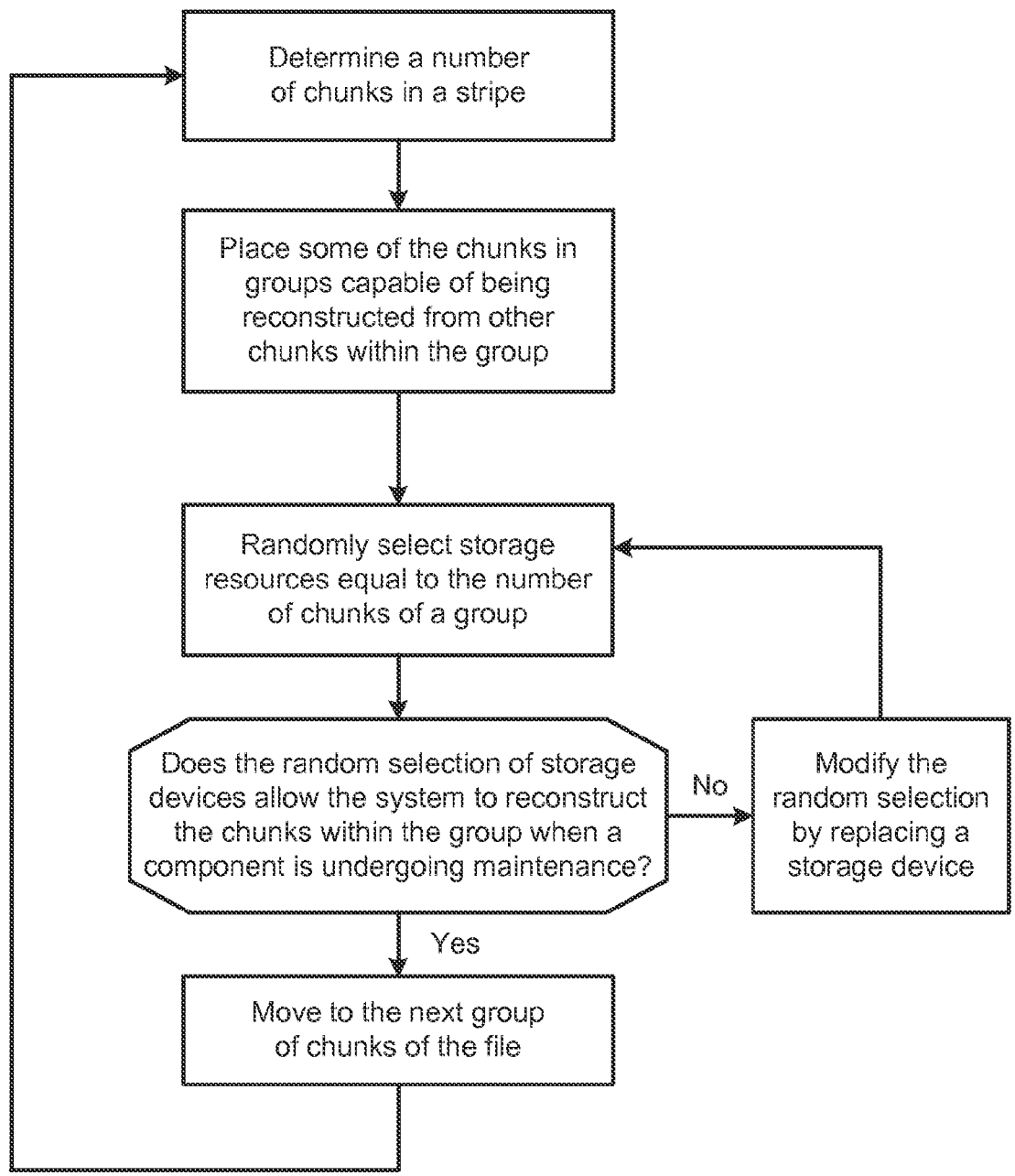
FIG. 6A is a flow chart of an exemplary arrangement of operations for randomly selecting a group of storage resources then randomly updating storage devices within the group.
Figure 6B:
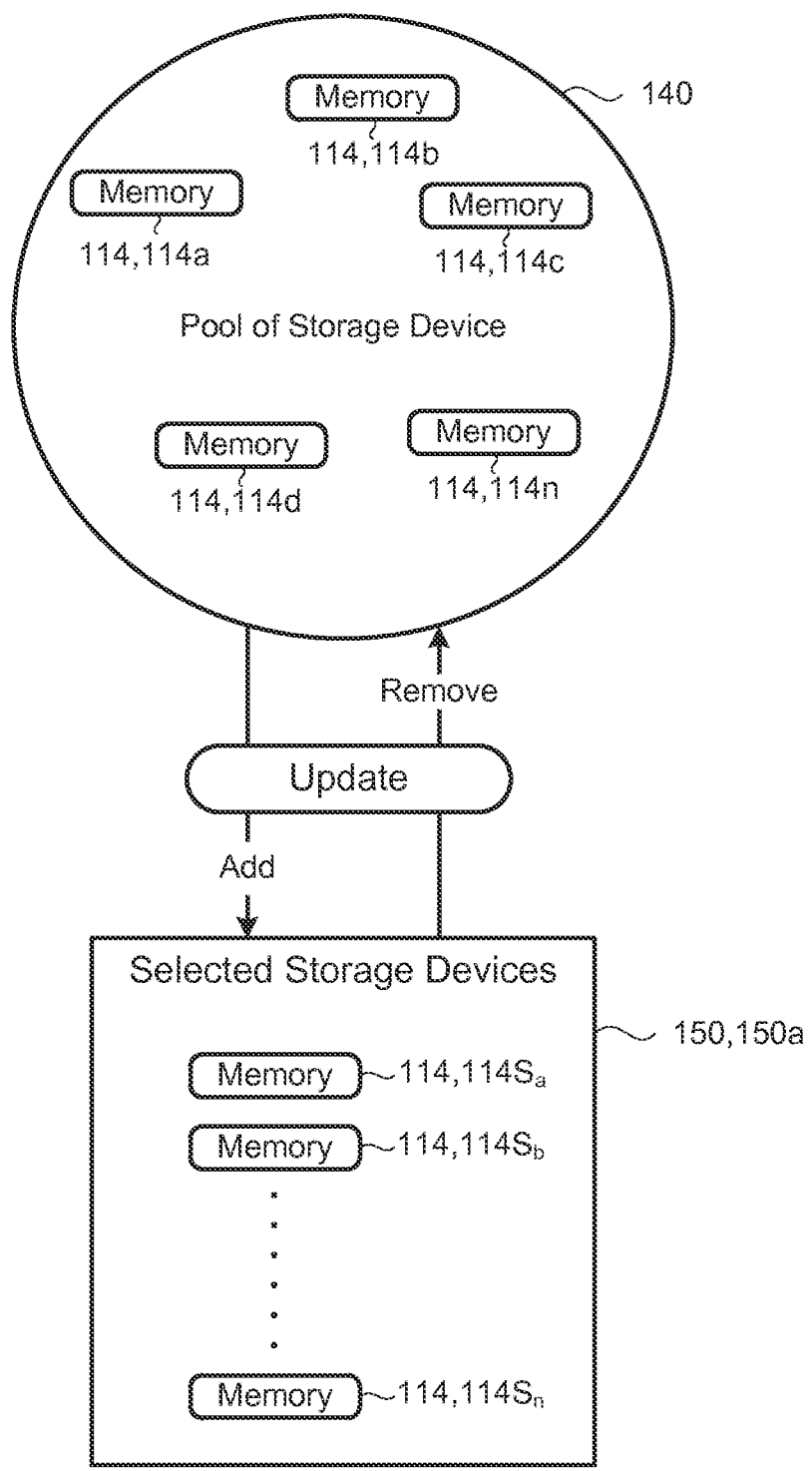
FIG. 6B is a schematic view of an exemplary random selection of storage devices.

Referring to FIGS. 6A and 6B, in some implementations, when the processor 202 determines that the first random 150a selection of selected memory hosts 110S is incapable of maintaining accessibility of the group G when one or more (or a threshold number of) maintenance domains 402 are in an inactive state, the processor 202 modifies the first random selection 150a of selected memory hosts 110S by adding one or more randomly selected memory hosts 110S and removing a corresponding number of different memory hosts 110S. The processor 202 then determines if the updated first random selection 150a is capable of maintaining accessibility of the group G when one or more (or a threshold number of) maintenance domains 402 are in an inactive state. If the processor 202 determines that updated first random selection 150a is incapable of maintaining accessibility of the group G when one or more (or a threshold number of) maintenance domains 402 are in an inactive state, the processor 202 updates the selection 150a of selected memory hosts 110S by adding and removing one or more randomly selected memory host 110S. The processor 202 continues to update the random selection 150a of memory hosts 110 until the processor 202 determines that the selected memory hosts 110S are capable of maintaining accessibility of the group G of chunks 330 during maintenance of the distributed storage system 100. Once the processor 202 makes that determination, the processor 202 moves to the next stripe 320 (or file 310) to determine a distribution of the next stripe 320. In some implementations, the processor 202 determines the random selection 150 of selected memory hosts 110S by using a probability sampling, a simple sampling, a stratified sampling, a cluster sampling, or a combination therefrom.

Figure 7A:
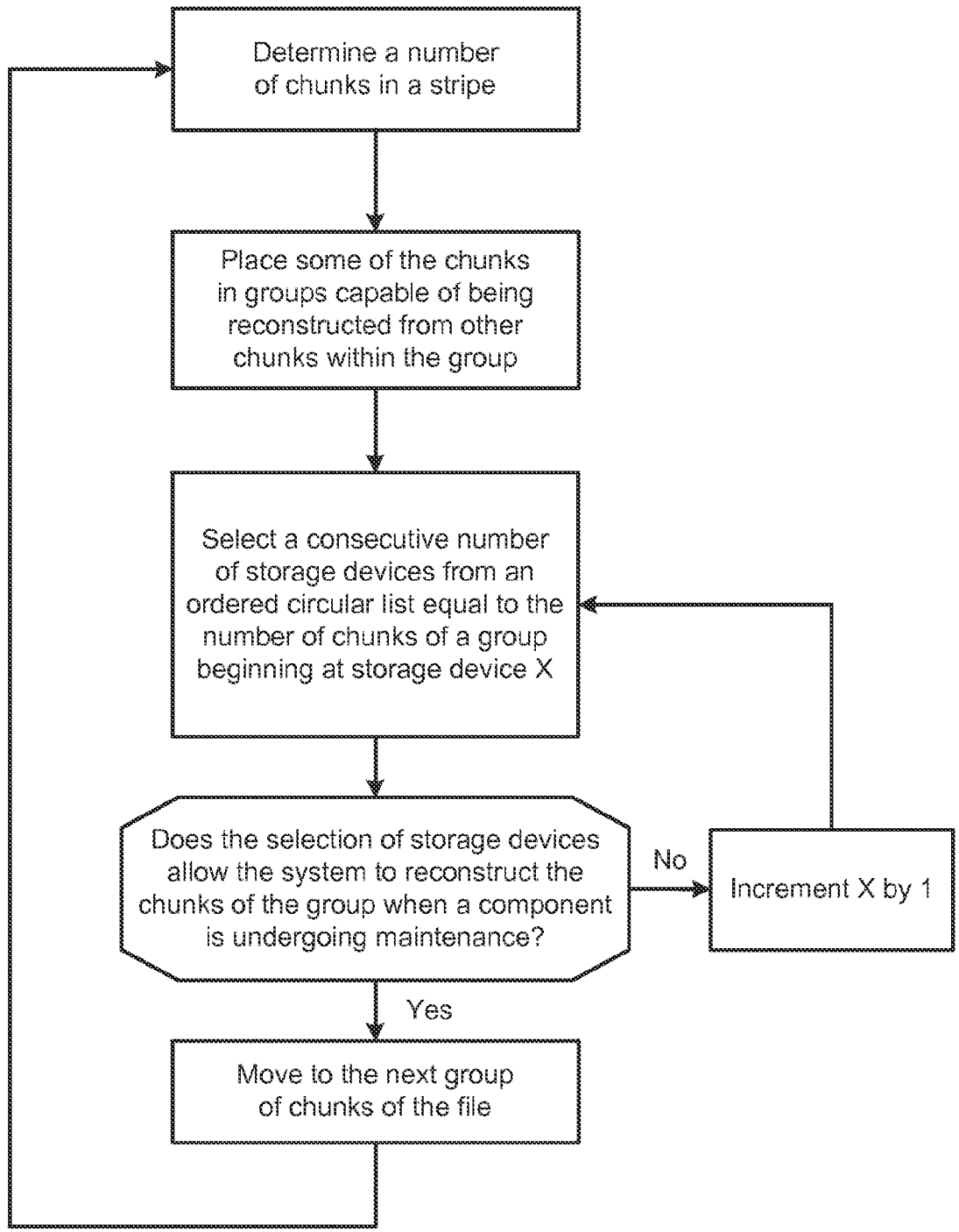
FIG. 7A is a flow chart of an exemplary arrangement of operations for selecting a group of storage resources from a circular list.
Figure 7B:
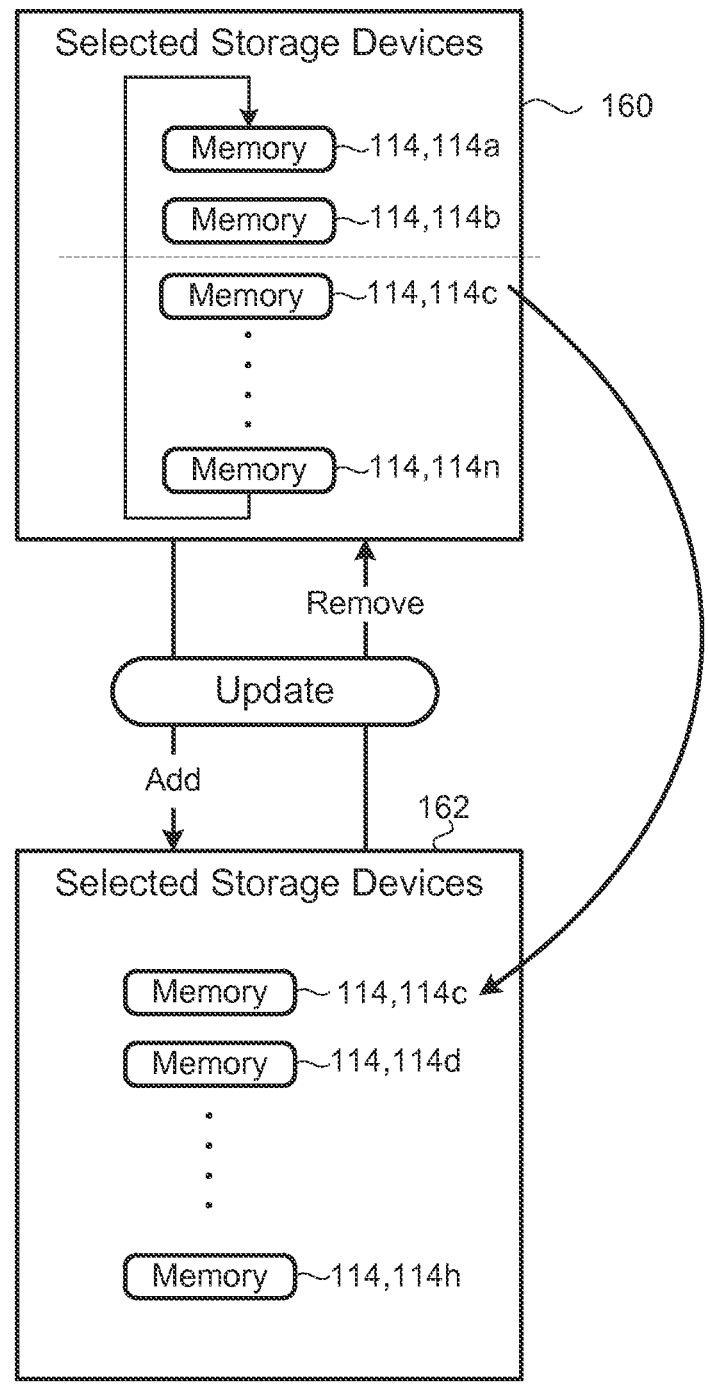
FIG. 7B is a schematic view of an exemplary selection of storage devices from an ordered list.

Referring to FIGS. 7A and 7B, in some implementations, the processor 202 determines a number of chunks 330 in a group G of chunks 330. The processor 202 then selects a selected list 162 having a consecutive number of memory hosts 110a-n equal to a number of chunks 330 of the file 310 from an ordered circular list 160 of memory hosts 110 of the distributed storage system 100, the ordered circular list 160 beginning at a first memory host 110a. The list 160 may be stored on the non-transitory memory 204 of the processor 202. The processor 202 then determines if the selected memory hosts 110a-n from the selected list 162 are collectively incapable of maintaining accessibility of the group G of chunks 330 when one or more (or a threshold number of) maintenance domains 402 are in an inactive state. If the processor 202 determines that the selected memory hosts 110a-n are collectively incapable of maintaining the accessibility of the group G of chunks 330 when one or more (or a threshold number of) maintenance domains 402 are in an inactive state, the processor 202 selects another selected list 162 having a consecutive number of memory hosts 110a-n from the ordered circular list 160 equal to the number of chunks 330 of the stripe 320 or file 310. In some examples, the processor 202 moves to a second memory host 110(n+1) after the first memory host 110n in the ordered circular list 160 when the processor 202 determines that memory hosts 110a-n of the selected list 162 are collectively incapable of maintaining the accessibility of the group G of chunks 330. In other examples, the processor 202 moves a predetermined number of positions down the ordered circular list 160. In some implementations, the processor 202 determines the ordered circular list 160 of memory hosts 110 of the storage system 100 where adjacent memory hosts 110 or a threshold number of consecutive memory hosts 110 on the ordered circular list 160 are associated with different maintenance domains 402. Additionally or alternatively, the processor 202 determines the ordered circular list 160 of memory hosts 110 of the storage system 100 where adjacent memory hosts 110 or a threshold number of consecutive memory hosts 110 on the ordered circular list 160 is each in different geographical locations. In some examples, the memory hosts 110 on the ordered circular list 160 are arranged so that different maintenance domains 402 cause the dispersion of data 312 sequentially along the ordered list 160. For example, as shown in FIG. 4A, the list 160 may not contain sequentially memory hosts 110 dependent from the same bust duct 430a. Instead, two sequential memory hosts 110 on the list 160 are from different maintenance domains 402 to make sure that data accessibility is maintained.

Figure 8:
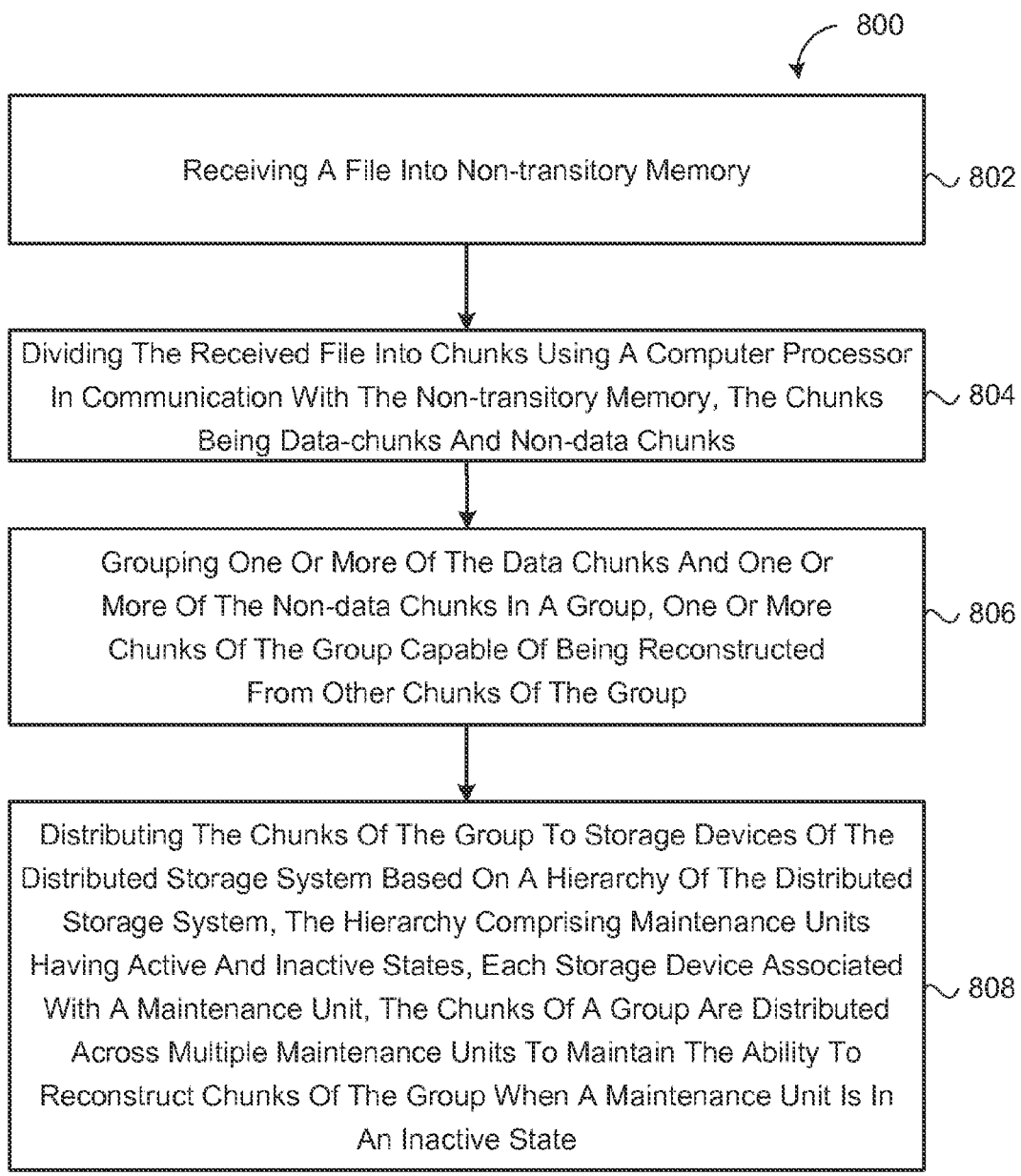
FIG. 8 is a schematic view of an exemplary arrangement of operations for distributing data in a storage system.

Referring to FIG. 8, in some implementations, a method 800 of distributing data 312 in a distributed storage system 100 includes receiving 802 a file 310 into non-transitory memory 204 and dividing 804 the received file 310 into chunks 330 using a computer processor 202 in communication with the non-transitory memory 204. The method 800 also includes grouping 806 one or more of the data chunks 330 and one or more of the non-data chunks 330 in a group G. One or more chunks 330 of the group G are capable of being reconstructed from other chunks 330 of the group G. The method 800 further includes distributing 808 chunks 330 of the group G to storage devices 114 of the distributed storage system 100 based on a hierarchy of the distributed storage system 100. The hierarchy includes maintenance domains 402 having active and inactive states. Moreover, each storage device 114 is associated with a maintenance domain 402. The chunks 330 of a group G are distributed across multiple maintenance domains 402 to maintain the ability to reconstruct chunks 330 of the group G when a maintenance domain 402 is in an inactive state.

In some implementations, the method 800 further includes restricting the number of chunks 330 of a group G distributed to storage devices 114 of any one maintenance domain 402. The method 800 further includes determining a distribution of the chunks 330 of a group G among the storage devices 114 by determining a first random selection 150a of storage devices 114 that matches a number of chunks 330 of the group G and determining if the selection of storage devices 114 is capable of maintaining accessibility of the group G when one or more units 402 are in an inactive state. In some examples, when the first random selection 150a of storage devices 114 is incapable of maintaining accessibility of the group G when one or more maintenance domains 402 are in an inactive state, the method 800 further includes determining a second random selection 150b of storage devices 114 that match the number of chunks 330 of the group G or modifying the first random selection 150a of storage devices 114 by adding or removing one or more randomly selected storage devices 114. The method 800 may further include determining the first random selection 150a of storage devices 114 using a simple sampling, a probability sampling, a stratified sampling, or a cluster sampling.

In some implementations, the method 800 further includes determining a distribution of the chunks 330 of the group G among the storage devices 114 by selecting a consecutive number of storage devices 114 equal to a number of chunks 330 of the group G from an ordered circular list 160 of the storage devices 114 of the distributed storage. When the selected storage devices 114 are collectively incapable of maintaining the accessibility of the group G when one or more maintenance domains 402 are in an inactive state, the method 800 further includes selecting another consecutive number of storage devices 114 from the ordered circular list 160 equal to the number of chunks 330 of the group G. Additionally or alternatively, the method 800 further includes determining the ordered circular list 160 of storage devices 114 of the distributed storage system 100. Adjacent storage devices 114 on the ordered circular list 160 are associated with different maintenance domains 402. In some examples, a threshold number of consecutive storage devices 114 on the ordered circular list 160 are each associated with different maintenance domains 402 or are each in different geographical locations.

In some implementations, the method 800 further includes determining the maintenance hierarchy 400 of maintenance domains 402 (e.g., using the computer processor 202), where the maintenance hierarchy 400 has maintenance levels and each maintenance level includes one or more maintenance domains 402. The method 800 also includes mapping each maintenance domain 402 to at least one storage device 114. In some examples, each maintenance domain 402 includes storage devices 114 powered by a single power distribution unit 420 or a single power bus duct 430.

The method 800 may further include dividing the received file 310 into stripes 320. Each file 310 includes an error correcting code 313. The error correcting code 313 is one of a Reed-Solomon code, a nested code or a layered code. The non-data chunks 330 include code-check chunks 330nCC, word-check chunks 330nCC, and code-check-word-check chunks 330nCCWC.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of distributing data in a distributed storage system, the method comprising:
   receiving a file into non-transitory memory;
   dividing the received file into chunks using a computer processor in communication with the non-transitory memory, the chunks being data-chunks and non-data chunks;
   grouping one or more of the data chunks and one or more of the non-data chunks in a group, one or more of the data chunks or one or more of the non-data chunks of the group capable of being reconstructed from other chunks of the group; and
   determining a distribution of the chunks of the group among storage devices of the distributed storage system based on a maintenance hierarchy of the distributed storage system, the maintenance hierarchy comprising maintenance domains having active and inactive states, each storage device associated with a maintenance domain, wherein the distribution comprises a random selection of storage devices matching a number of the chunks of the group capable of maintaining accessibility of the group when one or more maintenance domains are in the inactive state; and
   distributing the chunks of the group to the storage devices based on the determined distribution, the chunks of the group being distributed across multiple maintenance domains to maintain an ability to reconstruct chunks of the group when a maintenance domain is in the inactive state.

2. The method of claim 1, further comprising restricting a number of chunks of the group distributed to the storage devices of any one maintenance domain.

3. The method of claim 1, wherein when the random selection of the storage devices is incapable of maintaining accessibility of the group when one or more maintenance domains are in the inactive state, modifying the random selection of the storage devices by adding and/or removing one or more randomly selected storage devices.

4. The method of claim 1, further comprising determining the random selection of the storage devices using a simple sampling, a probability sampling, a stratified sampling, or a cluster sampling.

5. The method of claim 1, further comprising:
   determining, using the computer processor, the maintenance hierarchy of maintenance domains, the maintenance hierarchy having maintenance levels, each maintenance level comprising one or more maintenance domains; and
   mapping each maintenance domain to at least one storage device.

6. The method of claim 5, wherein each maintenance domain comprises storage devices powered by a single power distribution unit or a single power bus duct.

7. A method of distributing data in a distributed storage system, the method comprising:
   receiving a file into non-transitory memory;
   dividing the received file into chunks using a computer processor in communication with the non-transitory memory, the chunks being data-chunks and non-data chunks;
   grouping one or more of the data chunks and one or more of the non-data chunks in a group, one or more of the data chunks or one or more of the non-data chunks of the group capable of being reconstructed from other chunks of the group;
   determining a distribution of the chunks of the group among storage devices of the distributed storage system based on a maintenance hierarchy of the distributed storage system by selecting a consecutive number of the storage devices equal to a number of the chunks of the group from an ordered circular list of the storage devices of the distributed storage system, the maintenance hierarchy comprising maintenance domains having active and inactive states, each storage device associated with a maintenance domain, the chunks of the group distributed across multiple maintenance domains to maintain an ability to reconstruct chunks of the group when a maintenance domain is in the inactive state, and when the selected storage devices are collectively incapable of maintaining the ability to reconstruct chunks of the group when a maintenance domain is in the inactive state, selecting another consecutive number of storage devices from the ordered circular list equal to the number of chunks of the group; and
   distributing the chunks of the group to the storage devices of the distributed storage system based on the determined distribution.

8. The method of claim 7, further comprising determining the ordered circular list of storage devices of the distributed storage system, adjacent storage devices on the ordered circular list associated with different maintenance domains.

9. The method of claim 8, wherein a threshold number of consecutive storage devices on the ordered circular list are each associated with different maintenance domains.

10. The method of claim 8, wherein a threshold number of consecutive storage devices on the ordered circular list are each in different geographical locations.

11. A method of distributing data in a distributed storage system, the method comprising:
    receiving a file into non-transitory memory;
    dividing the received file into stripes and each stripe into chunks using a computer processor in communication with the non-transitory memory, the chunks being data-chunks and non-data chunks, each file including an error correcting code, the error correcting code comprising one of a nested code or a layered code, the non-data chunks comprising code-check chunks, word-check chunks, and code-check-word-check chunks;
    grouping one or more of the data chunks and one or more of the non-data chunks in a group, one or more of the data chunks or one or more of the non-data chunks of the group capable of being reconstructed from other chunks of the group; and
    distributing the chunks of the group to storage devices of the distributed storage system based on a maintenance hierarchy of the distributed storage system, the maintenance hierarchy comprising maintenance domains having active and inactive states, each storage device associated with a maintenance domain, the chunks of the group being distributed across multiple maintenance domains to maintain an ability to reconstruct chunks of the group when a maintenance domain is in the inactive state.

12. A system for distributing data in a distributed storage system, the system comprising:
non-transitory memory receiving a file;
a computer processor in communication with the non-transitory memory, the computer processor:
dividing the received file into chunks, the chunks being data-chunks and non-data chunks; and
grouping one or more of the data chunks and one or more of the non-data chunks in a group, one or more of the data chunks or one or more of the non-data chunks of the group capable of being reconstructed from other chunks of the group; and
storage devices in communication with the computer processor and the non-transitory memory, the computer processor:
determining a distribution of the chunks of the group among the storage devices based on a maintenance hierarchy of the distributed storage system, the maintenance hierarchy comprising maintenance domains having active and inactive states, each storage device associated with a maintenance domain, wherein the distribution comprises a random selection of the storage devices matching a number of the chunks of the group capable of maintaining accessibility of the group when one or more maintenance domains are in the inactive state; and
distributing the chunks of the group to the storage devices based on the determined distribution, the chunks of the group distributed across multiple maintenance domains to maintain accessibility of the group when a maintenance domain is in the inactive state.

13. The system of claim 12, wherein the computer processor restricts a number of the chunks of the group distributed to the storage devices of any one maintenance domain.

14. The system of claim 12, wherein the computer processor modifies the random selection of the storage devices by adding and removing one or more randomly selected storage devices when the random selection of the storage devices is incapable of maintaining accessibility of the file when one or more maintenance domains are in the inactive state.

15. The system of claim 12, wherein the computer processor determines the random selection of the storage devices using a simple sampling, a probability sampling, a stratified sampling, or a cluster sampling.

16. The system of claim 12, wherein the computer processor:
determines the maintenance hierarchy of maintenance domains, the maintenance hierarchy having maintenance levels, each maintenance level comprising one or more maintenance domains; and
maps each maintenance domain to at least one storage device.

17. The system of claim 16, wherein each maintenance domain comprises storage devices powered by a single power distribution unit or a single power bus duct.

18. A system for distributing data in a distributed storage system, the system comprising:
non-transitory memory receiving a file;
a computer processor in communication with the non-transitory memory, the computer processor:
dividing the received file into chunks, the chunks being data-chunks and non-data chunks; and
grouping one or more of the data chunks and one or more of the non-data chunks in a group, one or more of the data chunks or one or more of the non-data chunks of the group capable of being reconstructed from other chunks of the group; and
storage devices in communication with the computer processor and the non-transitory memory, the computer processor:
determining a distribution of the chunks among the storage devices based on a maintenance hierarchy of the distributed storage system by selecting a consecutive number of the storage devices equal to a number of the chunks of the group from an ordered circular list of the storage devices of the distributed storage system, the maintenance hierarchy comprising maintenance domains having active and inactive states, each storage device associated with a maintenance domain, the chunks of the group distributed across multiple maintenance domains to maintain accessibility of the group when a maintenance domain is in the inactive state, and when the selected storage devices are collectively incapable of maintaining the accessibility of the group when one or more maintenance domains are in the inactive state, selecting another consecutive number of the storage devices from the ordered circular list equal to the number of the chunks of the group; and
storing the chunks of the group on the storage devices based on the determined distribution.

19. The system of claim 18, wherein the computer processor determines the ordered circular list of the storage devices of the distributed storage system, adjacent storage devices on the ordered circular list associated with different maintenance domains.

20. The system of claim 19, wherein a threshold number of consecutive storage devices on the ordered circular list are each associated with different maintenance domains.

21. The system of claim 19, wherein a threshold number of consecutive storage devices on the ordered circular list are each in different geographical locations.

22. A system for distributing data in a distributed storage system, the system comprising:
non-transitory memory receiving a file;
a computer processor in communication with the non-transitory memory, the computer processor:
divides the received file into stripes and each stripe into chunks, the chunks being data-chunks and non-data chunks, each file including an error correcting code, the error correcting code comprising one of a nested code or a layered code, the non-data chunks comprising code-check chunks, word-check chunks, and code-check-word-check chunks; and
grouping one or more of the data chunks and one or more of the non-data chunks in a group, one or more of the data chunks or one or more of the non-data chunks of the group capable of being reconstructed from other chunks of the group; and
storage devices in communication with the computer processor and the non-transitory memory, the computer processor storing the chunks of the group on the storage devices based on a maintenance hierarchy of the distributed storage system, the maintenance hierarchy comprising maintenance domains having active and inactive states, each storage device associated with a maintenance domain, the computer processor distributing the chunks of the group across multiple maintenance domains to maintain accessibility of the group when a maintenance domain is in the inactive state.

* * * * *